(12) United States Patent
Yoo et al.

(10) Patent No.: US 10,817,078 B2
(45) Date of Patent: Oct. 27, 2020

(54) STYLUS PEN AND ELECTRONIC DEVICE INCLUDING SAME

(71) Applicant: Samsung Electronics Co., Ltd., Gyeonggi-do (KR)

(72) Inventors: Chung Keun Yoo, Gyeonggi-do (KR); Young Sun Park, Gyeonggi-do (KR); Seung Hyun Hwang, Gyeonggi-do (KR); Sang Min Kim, Seoul (KR); Dae Young Noh, Seoul (KR); Young Jin An, Gyeonggi-do (KR); Soon Woong Yang, Gyeonggi-do (KR); Seung Hoon Lee, Seoul (KR); Yun Jae Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 4 days.

(21) Appl. No.: 15/747,382

(22) PCT Filed: May 3, 2016

(86) PCT No.: PCT/KR2016/004640
§ 371 (c)(1),
(2) Date: Jan. 24, 2018

(87) PCT Pub. No.: WO2017/026627
PCT Pub. Date: Feb. 16, 2017

(65) Prior Publication Data
US 2018/0217687 A1 Aug. 2, 2018

(30) Foreign Application Priority Data
Aug. 11, 2015 (KR) .................. 10-2015-0112994

(51) Int. Cl.
*G06F 3/03* (2006.01)
*G06F 3/0354* (2013.01)
*G06F 1/16* (2006.01)

(52) U.S. Cl.
CPC ............ *G06F 3/03545* (2013.01); *G06F 1/16* (2013.01); *G06F 1/1656* (2013.01); *G06F 2200/1632* (2013.01)

(58) Field of Classification Search
CPC ...... G06F 3/03545; G06F 1/1656; G06F 1/16; G09G 2200/1632
See application file for complete search history.

(56) References Cited

U.S. PATENT DOCUMENTS

| 5,889,512 A | 3/1999 | Moller et al. |
| 6,043,807 A * | 3/2000 | Carroll ............... G06F 3/03543 345/157 |

(Continued)

FOREIGN PATENT DOCUMENTS

| CN | 101373410 | 2/2009 |
| CN | 203287864 | 11/2013 |

(Continued)

OTHER PUBLICATIONS

PCT/ISA/210 Search Report issued on PCT/KR2016/004640 (pp. 7).

(Continued)

*Primary Examiner* — Liliana Cerullo
(74) *Attorney, Agent, or Firm* — The Farrell Law Firm, P.C.

(57) ABSTRACT

According to various embodiments of the present invention, a stylus pen can comprise: a pen body extended along an axial line; a touch tip provided on one end portion of the pen body; a cap arranged on the other end portion of the pen body; a first structure for changing the length of the stylus pen by moving the cap along the axial line; and a second structure coming in contact with at least a part of the first structure, and restricting the movement of the cap and/or the first structure.

12 Claims, 31 Drawing Sheets

(56) References Cited

U.S. PATENT DOCUMENTS

| | | |
|---|---|---|
| 6,914,596 B2 | 7/2005 | Liu et al. |
| 7,077,594 B1 | 7/2006 | Annerino et al. |
| 7,319,460 B2 | 1/2008 | Lee |
| 7,374,359 B1 | 5/2008 | Annerino et al. |
| 7,518,598 B2 | 4/2009 | Liu |
| 7,834,863 B2 | 11/2010 | Lee |
| 7,844,143 B2 | 11/2010 | Shioda et al. |
| 7,961,177 B2 | 6/2011 | Wang et al. |
| 8,852,122 B2 | 10/2014 | Mao et al. |
| 8,902,583 B2 | 12/2014 | Cheng |
| 8,920,339 B2 | 12/2014 | Mao et al. |
| 9,170,662 B2 | 10/2015 | Kim |
| 9,415,625 B2 | 8/2016 | Fisher et al. |
| 9,421,813 B2 | 8/2016 | Marino et al. |
| 9,696,241 B2 | 7/2017 | Mao et al. |
| 2003/0067453 A1 | 4/2003 | Liu et al. |
| 2003/0223185 A1* | 12/2003 | Doczy .................. G06F 1/1626 361/679.11 |
| 2005/0168500 A1 | 8/2005 | Lee |
| 2006/0055686 A1 | 3/2006 | Lee |
| 2007/0075987 A1 | 4/2007 | Liu |
| 2007/0188479 A1 | 8/2007 | Wang et al. |
| 2009/0050377 A1 | 2/2009 | Lee |
| 2009/0050378 A1 | 2/2009 | Lee |
| 2009/0317048 A1 | 12/2009 | Shioda et al. |
| 2013/0135798 A1 | 5/2013 | Cheng |
| 2014/0018701 A1 | 1/2014 | Mao et al. |
| 2014/0035887 A1 | 2/2014 | Kim |
| 2014/0249451 A1 | 9/2014 | Mao et al. |
| 2014/0255079 A1 | 9/2014 | Fisher et al. |
| 2015/0035809 A1 | 2/2015 | Kim et al. |
| 2015/0071694 A1 | 3/2015 | Marino et al. |
| 2015/0079614 A1 | 3/2015 | Mao et al. |
| 2015/0185211 A1 | 7/2015 | Mao et al. |
| 2016/0339737 A1 | 11/2016 | Fisher et al. |
| 2016/0349153 A1 | 12/2016 | Mao et al. |
| 2016/0364028 A1 | 12/2016 | Song et al. |

FOREIGN PATENT DOCUMENTS

| | | |
|---|---|---|
| JP | 07210292 | 8/1995 |
| KR | 20030095740 | 12/2003 |
| KR | 100566259 | 3/2006 |
| KR | 100626593 | 9/2006 |
| KR | 1020090007746 | 1/2009 |
| KR | 100928636 | 11/2009 |
| KR | 101259127 | 5/2013 |
| KR | 1020130129559 | 11/2013 |
| KR | 101418554 | 7/2014 |
| KR | 1020140096723 | 8/2014 |
| KR | 101474508 | 12/2014 |
| KR | 1020150016684 | 2/2015 |
| KR | 1020150019199 | 2/2015 |
| WO | WO 2015/116074 | 8/2015 |

OTHER PUBLICATIONS

PCT/ISA/237 Written Opinion issued on PCT/KR2016/004640 (pp. 6).
European Search Report dated Jul. 23, 2018 issued in counterpart application No. 16835270.6-1221, 7 pages.
Chinese Office Action dated Aug. 3, 2020 issued in counterpart application No. 201680047049.X, 17 pages.

* cited by examiner

STYLUS PEN AND ELECTRONIC DEVICE INCLUDING SAME

PRIORITY

This application is a National Phase Entry of PCT International Application No. PCT/KR2016/004640 which was filed on May 3, 2016, and claims priority to Korean Patent Application No. 10-2015-0112994, which was filed on Aug. 11, 2015, the content of each of which is incorporated herein by reference.

TECHNICAL FIELD

Various embodiments of the present invention relate to a stylus pen and an electronic device in which a stylus pen is removably received.

BACKGROUND ART

Electronic devices, such as a smartphone, a tablet PC, a digital camera, a notebook computer, a PDA, and the like, may include a display module for providing an image, text, a video, or the like to a user. These electronic devices may include a housing, a display module installed in the housing to perform a display function, a touch screen provided on a front surface of the display module, and the like.

Meanwhile, the electronic devices may include a touch screen function for processing a touch input generated by contact or access of a part of a user's body (e.g., a finger) or a stylus pen to a surface of the touch screen.

In recent years, a stylus pen has been mainly used to more accurately touch a touch screen, and an electronic device may have, on a side of a housing thereof, a storage space in which a stylus pen is removably received, to prevent losing the stylus pen. Furthermore, a separation recess for separating the stylus pen may be formed on a surface (e.g., a rear surface) of the housing adjacent to the storage space, and when the stylus pen is inserted into the storage space, an upper end of the stylus pen may be exposed to the outside through the separation recess. Accordingly, a user may easily separate the stylus pen by grasping the upper end of the stylus pen exposed to the outside through the separation recess.

DETAILED DESCRIPTION OF THE INVENTION

Technical Problem

However, since the electronic device in the related art has, on the rear surface of the housing thereof, the separation recess for separating the stylus pen, the entire appearance of the electronic device may be degraded. In addition, due to the separation recess, the electronic device may have a limitation in material selection and design for a rear cover or a battery cover provided on the rear surface of the housing of the electronic device and may also have a limitation in the design of the entire appearance of the housing.

Technical Solution

An electronic device according to various embodiments of the present invention includes a housing that includes a first surface facing a first direction, a second surface facing a second direction opposite to the first direction, and a lateral surface surrounding at least part of a space formed between the first surface and the second surface, an opening formed in one portion of the lateral surface of the housing, a storage space extending from the opening, with an axis as a center of the storage space, and a stylus pen that includes a first end surface including a touch tip and a second end surface opposite to the first end surface and has a length by which the entirety of the stylus pen is received in the storage space. The second end surface is arranged with another portion of the lateral surface of the housing in substantially the same plane in a case where the entirety of the stylus pen is received in the storage space, and the stylus pen is removable from the storage space. The second end surface of the stylus pen protrudes outside the storage space from the opening in a direction of the axis in response to external pressure.

An electronic device according to various embodiments of the present invention includes a housing that includes a first surface facing a first direction, a second surface facing a second direction opposite to the first direction, and a lateral surface surrounding at least part of a space formed between the first surface and the second surface, an opening formed in one portion of the lateral surface of the housing, a storage space extending from the opening, and a stylus pen that includes a first end portion including a touch tip and a second end portion opposite to the first end portion and has a length by which the entirety of the stylus pen is received in the storage space, the second end portion being arranged with another portion of the lateral surface of the housing in substantially the same plane in a case where the entirety of the stylus pen is received in the storage space, and the stylus pen being configured to be removable from the storage space. The second end portion of the stylus pen includes a cap configured to be pressed toward the storage space from outside the housing.

A stylus pen configured to provide an input to an electronic device according to various embodiments of the present invention includes a pen body formed with respect to an axis and including an outer surface and an inner surface, wherein the pen body extends in a direction of the axis, a cap disposed on one end of the pen body, a first structure configured to make contact with at least a portion of the inner surface of the pen body and to change in length in the direction of the axis in response to pressure applied to the cap, a second structure configured to make contact with at least a part of the first structure and to limit a movement of the cap and/or the first structure in the direction of the axis, and a touch tip disposed on an opposite end of the pen body.

Other aspects, advantages, and salient features of the invention will become apparent to those skilled in the art from the following detailed description, which, taken in conjunction with the annexed drawings, discloses various embodiments of the present invention.

Advantageous Effects of the Invention

According to embodiments disclosed herein, by receiving a stylus pen having a variable length in a storage space of a housing, it is easy to separate the stylus pen from the storage space of the housing without a separate separation recess in the housing.

Furthermore, according to various embodiments disclosed herein, since the housing does not have a separate separation recess formed therein, it is possible to apply various materials and designs to a rear cover, a battery cover, or the like and to design the entire appearance of an electronic device in various ways.

DESCRIPTION OF THE DRAWINGS

FIG. 9 is a portion of a sectional view taken along line C-C of FIG. 7.

MODE FOR INVENTION

Figure 1:
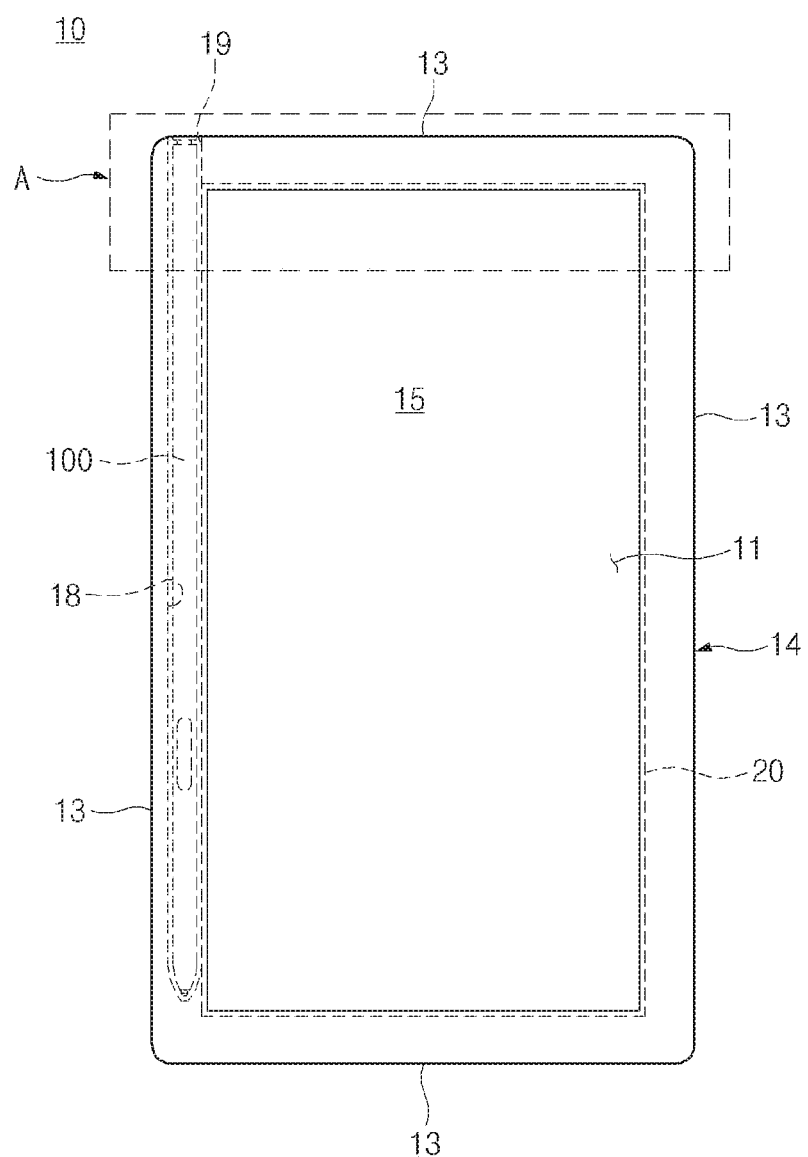
FIG. 1 is a front view of an electronic device according to an embodiment of the present invention.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Figure 2:
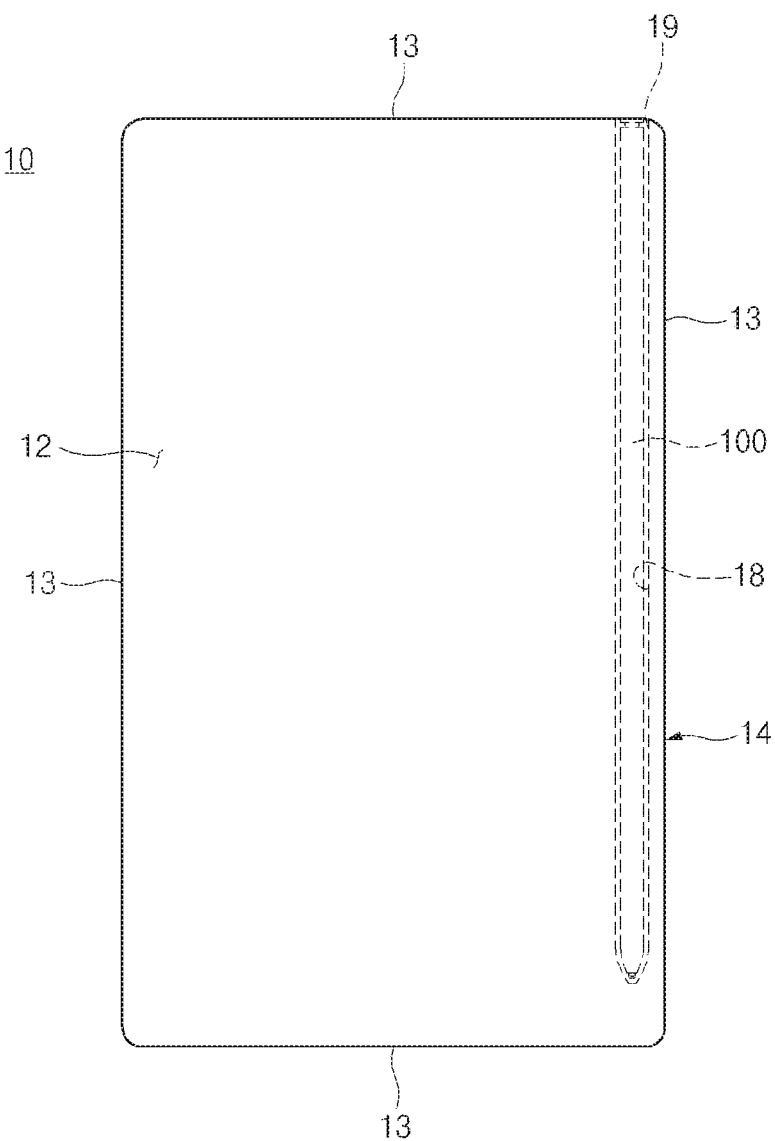
FIG. 2 is a rear view of an electronic device according to an embodiment of the present invention.

Referring to FIGS. 1 and 2, an electronic device 10 may include a housing 14 having a first surface 11 facing a first direction and a second surface 12 facing a second direction, and a display module 20 mounted in the housing 14. The housing 14 may include the first surface 11 facing the first direction, the second surface 12 facing the second direction opposite to the first direction, and a lateral surface 13 surrounding at least part of a space between the first surface 11 and the second surface 12.

The display module 20 may be mounted in the housing 14 to display an image, text, a video, or the like. The display module 20 may have a front surface on which an image, text, or a video is displayed and a rear surface opposite to the front surface. Part of the front surface of the display module 20 may be exposed in the direction toward the first surface 11 of the housing 14, and a screen 15 may be disposed on a front surface of the electronic device 10. The screen 15 of the electronic device 10 may be implemented with a touch screen having a touch screen function, and the touch screen may be implemented by mounting a touch screen panel on the front surface of the display module 20.

The housing 14 may have a storage space 18 formed on a side thereof, in which a stylus pen 100 configured to touch the touch screen of the display module 20 is removably received. The storage space 18 may extend a specified length along an edge of the housing 14. The storage space 18 may be closed at one end thereof within the housing 14, and an opening 19 exposed outside the housing 14 may be formed at an opposite end of the storage space 18. The storage space 18 may be formed in a structure corresponding to the shape and size of the stylus pen 100 to facilitate the storage of the stylus pen 100. The stylus pen 100 may extend in the direction of an axis 103 to have a length by which the entirety of the stylus pen 100 is received in the storage space 18 of the housing 14.

Referring to FIGS. 3 to 6, the stylus pen 100 may have a first end portion 110 and a second end portion 120. A first end surface of the first end portion 110 may include a touch tip 101, and the second end portion 120 may include a cap 150. The first end portion 110 and the second end portion 120 may be opposite to each other on the axis 103 of the stylus pen 100.

Figure 3:
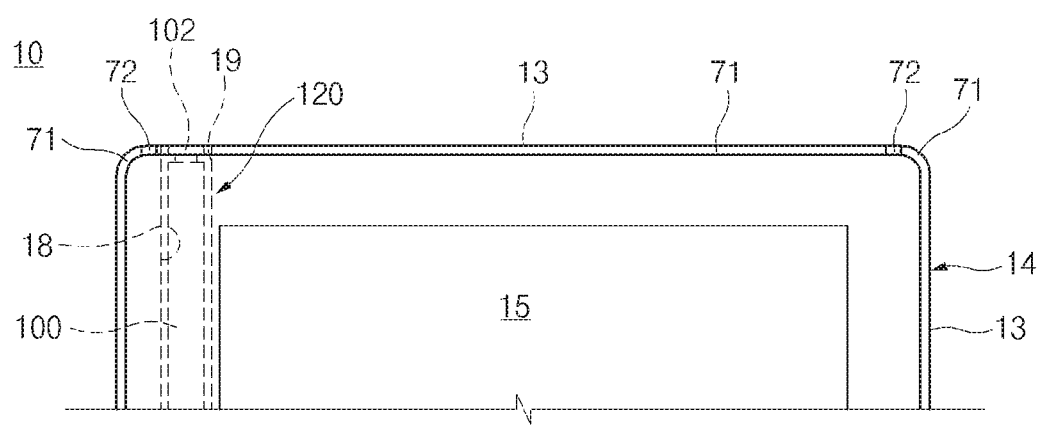
FIG. 3 is a blowup of detail "A" in FIG. 1.

In the state in which the stylus pen 100 is received in the storage space 18 of the housing 14, a second end surface 102 of the second end portion 120 of the stylus pen 100 and part of the lateral surface 13 of the housing 14 may be arranged in substantially the same plane, as illustrated in FIGS. 1 to 3. If the cap 150 is installed in the second end portion 120 of the stylus pen 100 and the stylus pen 100 is completely received in the storage space 18 of the housing 14, the second end surface 102 of the cap 150 and part of the lateral surface 13 of the housing 14 may be arranged in the same plane.

Since the cap 150 is arranged with the lateral surface 13 of the housing 14 in the same plane as described above, the cap 150 may be formed of the same material as the housing 14 in consideration of the appearance thereof. For example, in the case where the housing 14 is formed of a metal material, the cap 150 may also be formed of a metal material.

Referring to FIG. 3, one or more radiators 71 constituting an antenna may be provided on the lateral surface 13 of the housing 14, and at least one cut-off portion 72 may be formed at opposite ends of the radiators 71. The at least one cut-off portion 72 may be formed on the lateral surface 13 of the housing 14 to intersect with the first surface 11 and the second surface 12.

The cap 150 may be disposed between the cut-off portions 72 to minimize an influence on the set frequency of the antenna. To this end, the storage space 18 in which to receive the stylus pen 100 may be disposed between the cut-off portions 72. Especially, the storage space 18 may be disposed adjacent to any one cut-off portion 72 in consideration of interference with the display module 20.

Figure 4:
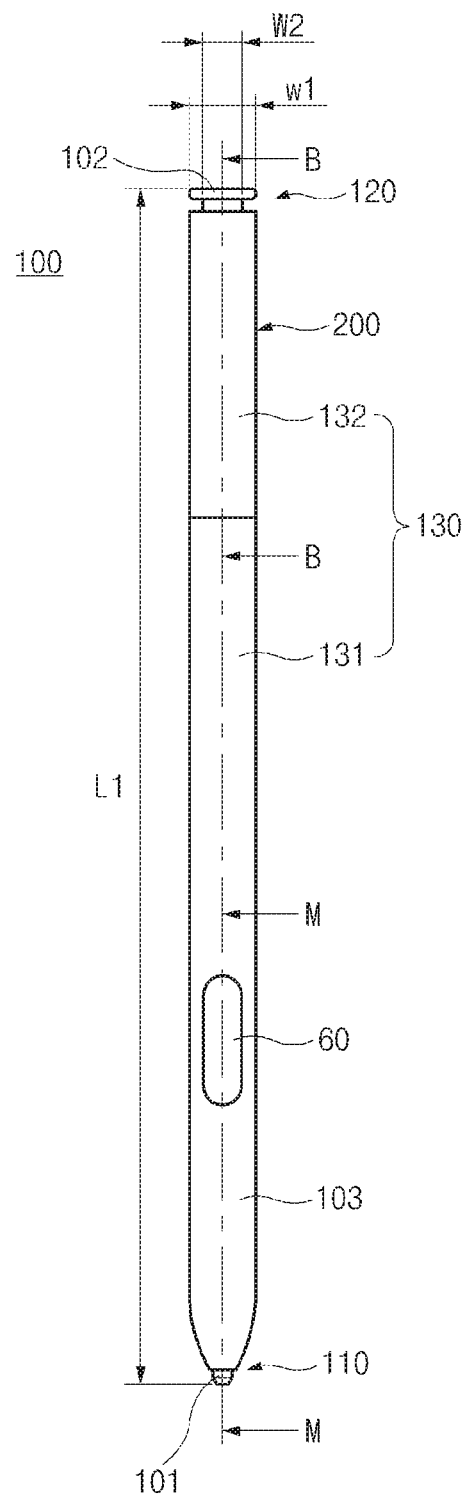
FIG. 4 is a front view of a stylus pen according to an embodiment of the present invention.
Figure 5:
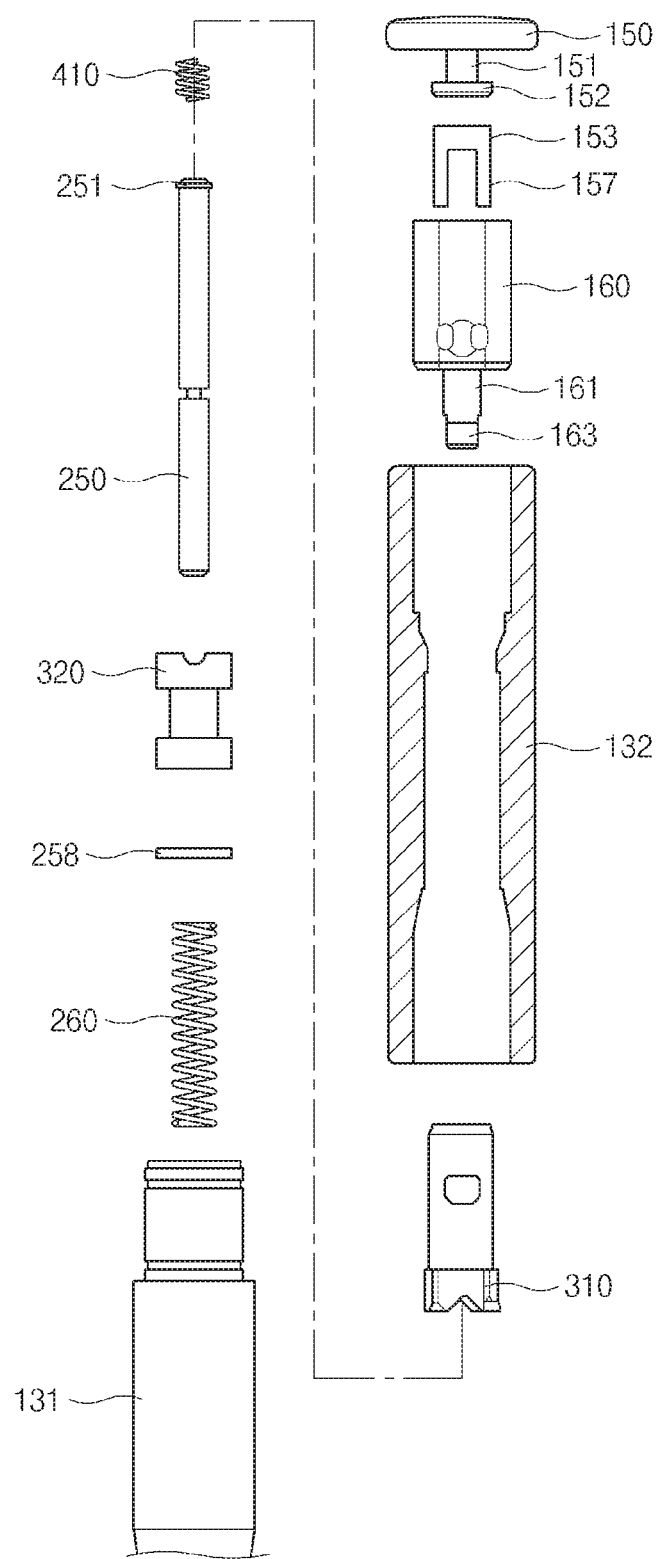
FIG. 5 is an exploded view of a stylus pen according to an embodiment of the present invention.

Referring to FIGS. 4 and 5, the cap 150 may have a first width w1 and may be coupled to a mounting member 160 having a second width w2 smaller than the first width w1 of the cap 150. For example, the mounting member 160 may correspond to a neck part of the stylus pen 100 that has a smaller width than the cap 150. The mounting member 160, together with the cap 150, may be movably installed in the second end portion 120 of the stylus pen 100. In short, the second end portion 120 of the stylus pen 100 may have a separation groove, into which a user's finger is able to be inserted, owing to the first width w1 of the cap 150 and the second width w2 of the mounting member 160, which corresponds to the neck part, and the separation groove may allow the user to easily separate the stylus pen 100.

Figure 8:
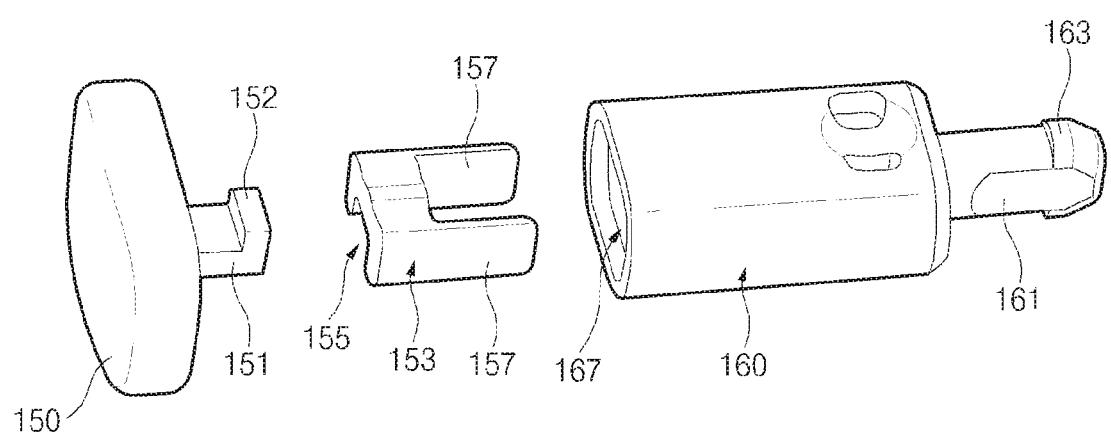
FIG. 8 is an exploded perspective view illustrating a connecting structure between a cap, a cap holder, and a connecting member of a stylus pen, according to an embodiment of the present invention.

Referring to FIGS. 5 and 8, a coupling rib 151 may extend from one surface of the cap 150 in one direction, and the coupling rib 151 of the cap 150 may be inserted into a cap holder 153. The cap holder 153 may be coupled to the mounting member 160 through press-fit, bonding, or the like. A stopper 152 may be formed on an end portion of the coupling rib 151, and an insertion recess 155 into which the coupling rib 151 is inserted may be formed in the cap holder 153. Accordingly, the coupling rib 151 of the cap 150 may be inserted into the insertion recess 155 of the cap holder 153.

The cap holder 153 may include a pair of legs 157 extending in one direction, and the legs 157 of the cap holder 153 may be inserted into a coupling recess 167 of the mounting member 160 and may be coupled to the mounting member 160 through insertion-coupling, screw-coupling, an adhesive, or the like. The legs 157 of the cap holder 153 may be bonded to the coupling recess 167 of the mounting member 160 through an adhesive, and thus the cap holder 153 may be very firmly coupled to the mounting member 160. The extending legs 157 of the cap holder 153 may be coupled to an inner surface of the coupling recess 167 of the mounting member 160 with a large contact area therebetween, and thus the cap holder 153 may be very firmly coupled to the mounting member 160.

A coupling protrusion 161 may protrude from one end portion of the mounting member 160, and a coupling hook 163 may be formed on a distal end portion of the coupling protrusion 161. The above-described coupling recess 167 may be formed in an opposite end portion of the mounting member 160.

As described above, by implementing the structure in which the cap 150 is coupled to the stylus pen 100 through the coupling rib 151, the cap holder 153, the mounting member 160, and the like, it is possible to relatively reduce the thickness of the cap 150.

According to various embodiments, as illustrated in FIG. 4, the stylus pen 100 may include a pen body 130 extending along the axis 103 and a variable length unit 200 installed in the pen body 130 to vary the length of the stylus pen 100. The pen body 130 may extend along the axis 103 and may have an inner space formed therein, in which various components are installed. The touch tip 101 may be installed in one end portion of the pen body 130, and the cap 150 may be installed in an opposite end portion of the pen body 130 so as to be movable along the axis 103. The length of the stylus pen 100 may be varied depending on a movement of the cap 150.

Figure 27A:
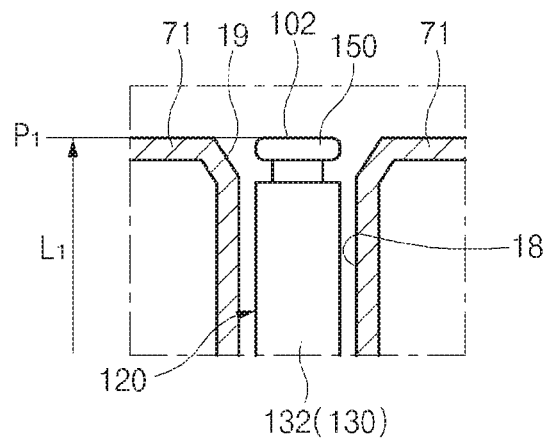
FIG. 27A illustrates a state in which a cap of a stylus pen according to an embodiment of the present invention is arranged at a first position in a storage space of an electronic device.

In more detail, as illustrated in FIG. 27A, the stylus pen 100 may have a first length L1, which is an initial length, if the second end surface 102 of the cap 150 is located at a first position P1, where the second end surface 102 is arranged with the lateral surface 13 of the electronic device 10 in the same plane, in the state in which the stylus pen 100 is received in the storage space 18 of the electronic device 10.

Figure 27B:
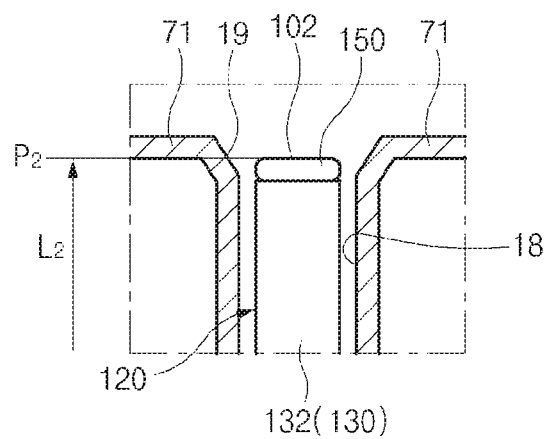
FIG. 27B illustrates a state in which a cap of a stylus pen according to an embodiment of the present invention is arranged at a second position in a storage space of an electronic device.

As illustrated in FIG. 27B, the stylus pen 100 may change in length to a second length L2 if the cap 150 is moved inward toward the storage space 18 by an external force applied thereto (e.g., by pressing the cap 150 by the user) to reach a second position P2, where the cap 150 makes contact with a second body 132 of the pen body 130.

Figure 27C:
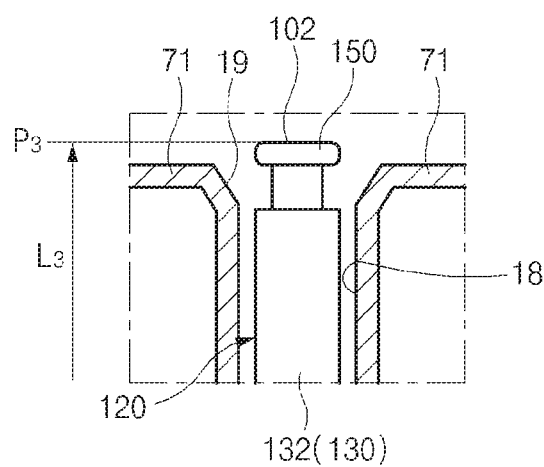
FIG. 27C illustrates a state in which a cap of a stylus pen according to an embodiment of the present invention is arranged at a third position in a storage space of an electronic device.

As illustrated in FIG. 27C, the stylus pen 100 may change in length to a third length L3 if the cap 150 is located at a third position P3, where the cap 150 protrudes outside the storage space 18 of the housing 14, by the variable length unit 200, which will be described below.

As described above, the length of the stylus pen 100 according to the present invention may be diversely changed to the first length L1, the second length L2, or the third length L3 by the movement of the movable cap 150 (e.g., to the first position P1, the second position P2, or the third position P3). Especially, in the case where the cap 150 of the stylus pen 100 protrudes to the outside, as illustrated in FIG. 27C, in the state in which the stylus pen 100 is received in the storage space 18 of the electronic device 10, the stylus pen 100 may be easily separated from the storage space 18 by the user.

According to various embodiments, the pen body 130 may include a first body 131 in which the touch tip 101 is installed and the second body 132 in which the variable length unit 200 is installed.

Referring to FIG. 4, the touch tip 101 may be installed to protrude a predetermined length from one end portion of the first body 131 and may be configured to touch the touch screen 15 of the electronic device 10. The touch tip 101 may be formed of a soft material, such as rubber, conductive foam, or the like, and may have a curved surface to prevent damage to the touch screen 15 of the electronic device 10.

Figure 28:
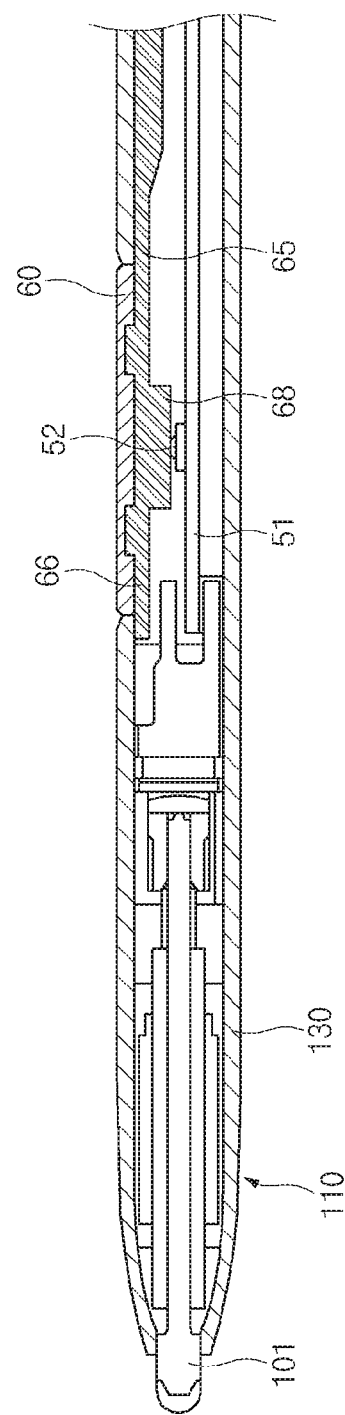
FIG. 28 is a sectional view taken along line M-M of FIG. 4.
Figure 29:
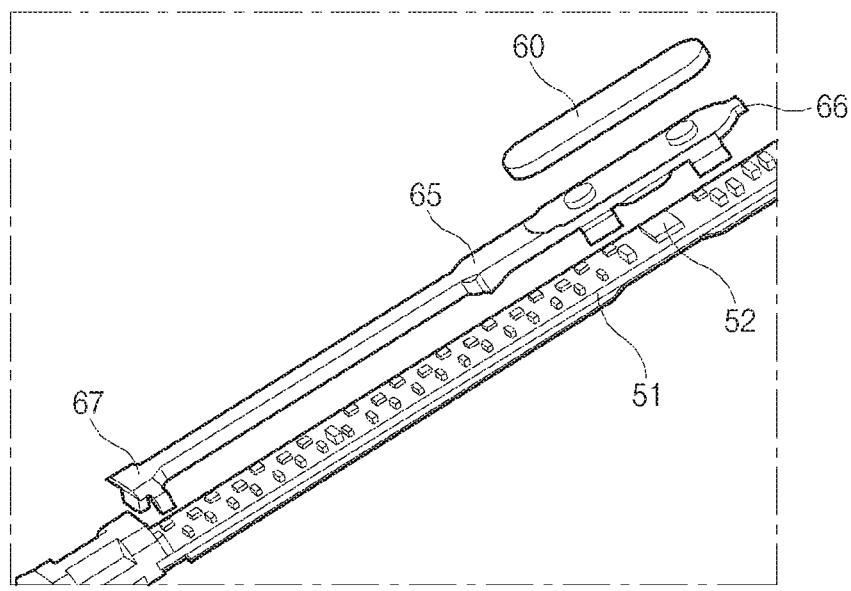
FIG. 29 is an exploded perspective view illustrating a function button, a reinforcing bracket, and a circuit board mounted in a stylus pen according to an embodiment of the present invention.

Referring to FIGS. 28 and 29, a printed circuit board (PCB) 51 having electronic components mounted thereon for performing various functions, such as note taking, drawing, painting, scroll, eraser, right click, and the like, other than a touch may be disposed in an inner space of the pen body 130 adjacent to the touch tip 101, that is, in an inner space of the first body 131, and one or more switching components 52 configured to perform functions may be mounted on the printed circuit board 51. A function button 60 configured to turn on/off the switching components 52 may be provided on the outside of the first body 131.

According to various embodiments, as illustrated in FIG. 28, a reinforcing bracket 65 may be attached to the bottom of the function button 60 through a fastener, hook-coupling, or the like, and the bottom of the function button 60 may be bonded to an upper surface of the reinforcing bracket 65 through an adhesive.

Referring to FIG. 29, the reinforcing bracket 65 may be installed on the inside of the first body 131 and may include a free end portion 66 not being anchored to the first body 131 and an anchored end portion 67 located on the opposite side to the free end portion 66. The free end portion 66 may be disposed adjacent to the function button 60, and the anchored end portion 67 may be fixedly installed on the inside of the first body 131. Accordingly, the free end portion 66 may move up and down relative to the anchored end portion 67, and thus the reinforcing bracket 65 may facilitate an on/off operation of the function button 60 and may ensure the rigidity of the function button 60. Furthermore, a protrusion 68 may be formed on the bottom of the reinforcing bracket 65 to make contact with the switching components 52. The protrusion 68 may facilitate on/off operations of the switching components 52.

The variable length unit 200 may be installed in an inner space adjacent to an opposite end portion of the pen body 130, that is, inside the second body 132 and may be configured to vary the length of the stylus pen 100. If an external force is applied to the stylus pen 100 in the state in which the stylus pen 100 is received in the storage space 18 of the housing 14, the variable length unit 200 may allow one side of the stylus pen 100 to protrude outside the storage space 18 of the housing 14. If external pressure is applied to the cap 150 (e.g., the cap 150 is pressed), the variable length unit 200 may move the cap 150 in the direction of the axis 103. Accordingly, the length of the stylus pen 100 may be changed to, for example, the first length L1, the second length L2, or the third length L3.

Figure 6:
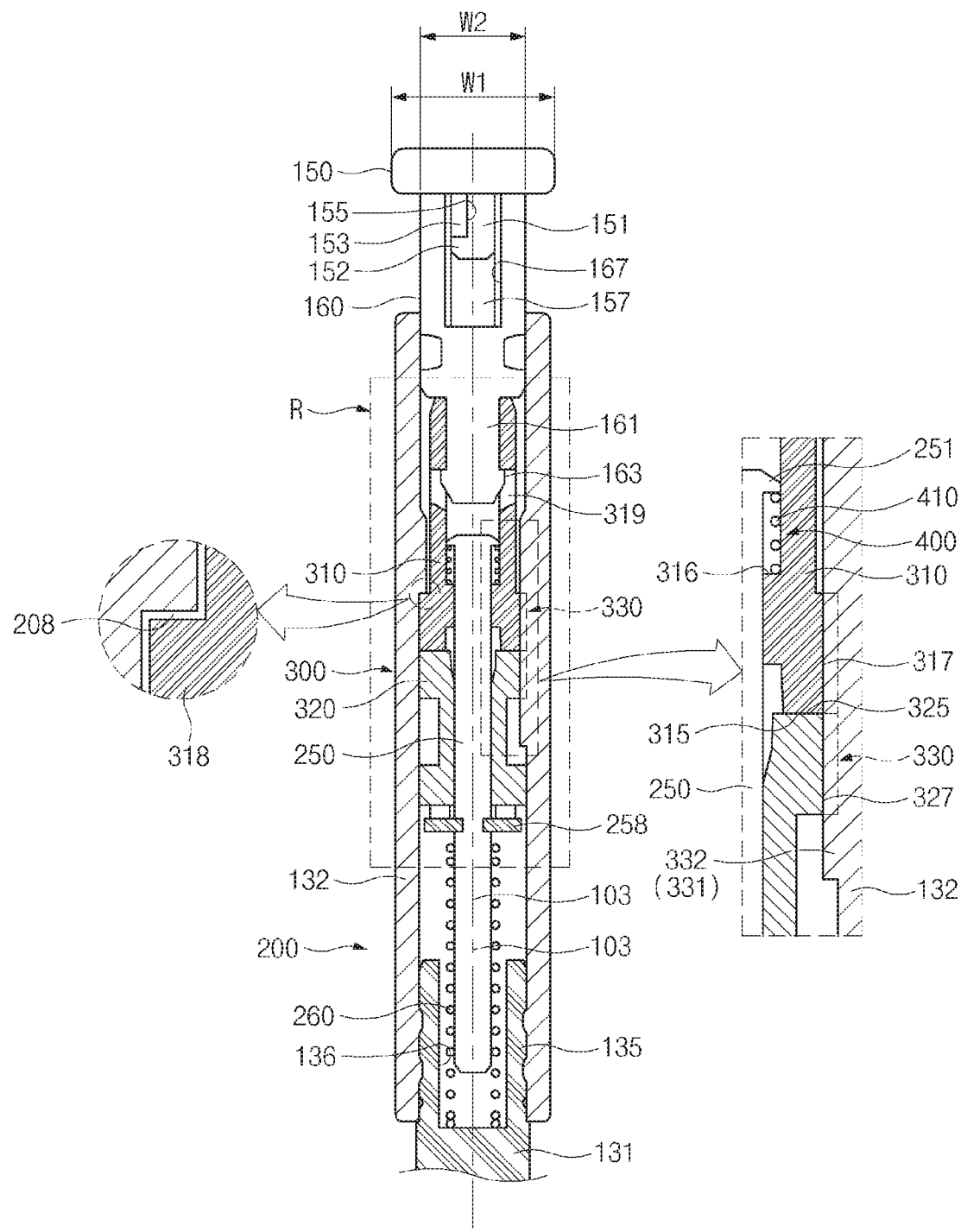
FIG. 6 is a sectional view taken along line B-B of FIG. 4.
Figure 7:
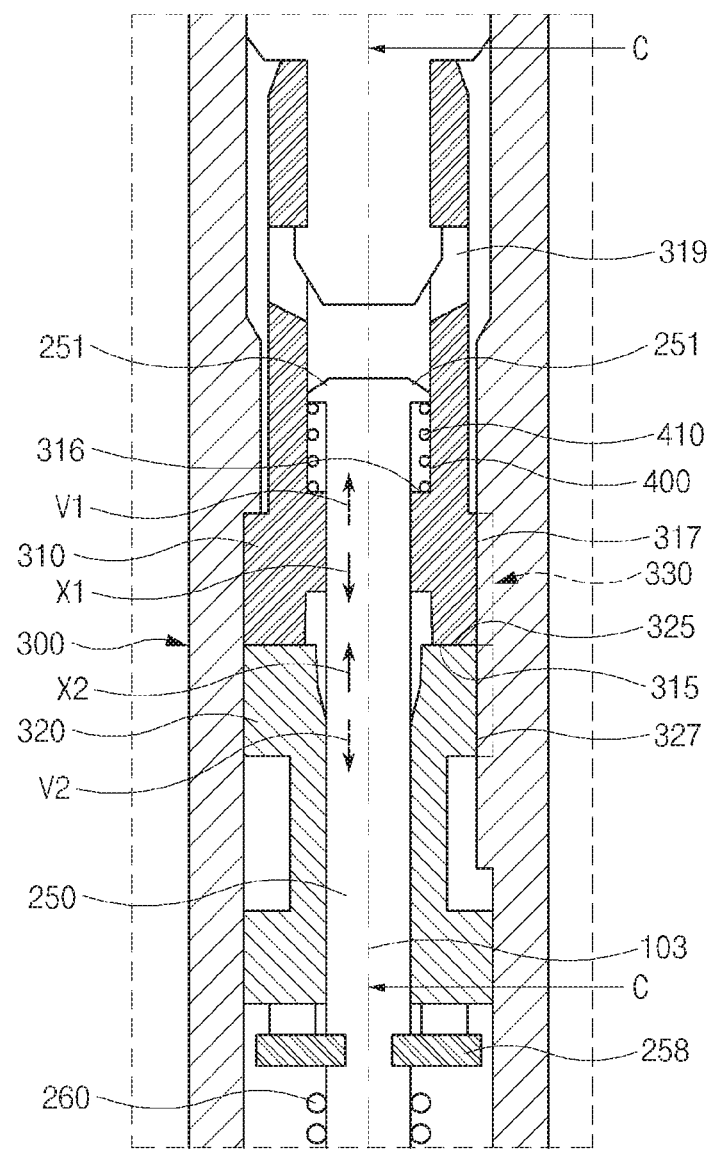
FIG. 7 is a blowup of detail "R" in FIG. 6.

According to various embodiments, referring to FIGS. 5 to 7, the variable length unit 200 may include a shaft 250 movable in the pen body 130 in the direction of the axis 103 and an elastic member 260 elastically supporting the shaft 250. The shaft 250 may be installed in an inner space adjacent to the opposite end portion of the pen body 130, that is, in an inner space of the second body 132 so as to be movable along the axis 103. One end portion of the second body 132 may be coupled to the opposite end portion of the first body 131. According to an embodiment, a coupling part 135 may be formed on the opposite end portion of the first body 131, and the one end portion of the second body 132 may be coupled to the coupling part 135 of the first body 131 through press-fit, bonding, or the like. Further, corrugated portions corresponding to each other may be formed on an outer surface of the coupling part 135 of the first body 131 and an inner surface of the one end portion of the second body 132 to strengthen the coupling force between the first body 131 and the second body 132. According to another embodiment, the second body 132 may be integrally formed with the opposite end portion of the first body 131.

The elastic member 260 may be mounted on one end portion of the shaft 250, and the shaft 250 may be elastically supported by the elastic member 260. The cap 150 may be connected to an opposite end portion of the shaft 250 through the cap holder 153 and the mounting member 160 described above. Accordingly, if an external force is applied to the cap 150, the shaft 250 may be moved in the direction of the axis 103 by the elastic force of the elastic member 260, and the cap 150 may protrude from the opening 19 of the storage space 18 in the housing 14 to the outside.

The shaft 250 may be installed such that the shaft 250 is linearly moved in the second body 132 by the elastic member 260 and a cam mechanism 300. The cam mechanism 300 may move the shaft 250 in cooperation with the elastic member 260.

According to various embodiments, referring to FIGS. 5 to 7, the cam mechanism 300 may include a first moving member 310 configured to linearly move in the second body 132 when an external force is applied to the cap 150 in the direction of the axis 103, a second moving member 320 configured to linearly move and rotate in conjunction with the linear motion of the first moving member 310, and a guide structure 330 provided in the second body 132 to guide the movement of the first moving member 310 and the second moving member 320.

The first moving member 310 may have a cylindrical structure with a predetermined outer diameter. The first moving member 310 may include at least one first cam surface 315 on one end portion thereof, and the first cam surface 315 may include ridge portions and valley portions. The first moving member 310 may also include a plurality of first cam surfaces 315 following one after another in the circumferential direction.

An opposite end portion of the first moving member 310 may be connected to the cap 150 through the mounting member 160 and the cap holder 153 described above. Especially, the hook 163 of the coupling protrusion 161 may be coupled to a coupling hole 319 of the first moving member 310 by a snap-fit connection after the coupling protrusion 161 of the mounting member 160 is inserted into the first moving member 310, and thus the mounting member 160 may be very firmly coupled to the opposite end portion of the first moving member 310. Since the first moving member 310 is connected to the cap 150 through the mounting member 160 and the cap holder 153 as described above, the first moving member 310, together with the cap 150, may linearly move along the axis 103 when the cap 150 is pressed. Furthermore, since the opposite end portion of the shaft 250 is inserted into the first moving member 310, the opposite end portion of the shaft 250 may be connected to the first moving member 310. Accordingly, the shaft 250 may be connected to the cap 150 through the first moving member 310, the mounting member 160, and the cap holder 153, and thus the first moving member 310 may be configured to linearly move together with the cap 150.

The second moving member 320 may be configured to linearly move and rotate in conjunction with the linear motion of the first moving member 310. The second moving member 320 may be configured such that an elastic force is applied to the second moving member 320 by the elastic member 260, which is disposed in a case, in the direction of the axis 103. The shaft 250 may pass through the second moving member 320 and may be coupled, at one side thereof, to the second moving member 320 through a fixing ring 258, such as an E-ring, a C-ring, or the like, and the fixing ring 258 of the shaft 250 may be configured to withstand the elastic force of the elastic member 260.

The elastic member 260 may be installed between the coupling part 135 of the first body 131 and the fixing ring 258 of the shaft 250. The coupling part 135 may have an insertion recess 136 formed therein. One end portion of the elastic member 260 may be inserted into and supported by the insertion recess 136 of the coupling part 135, and an opposite end portion of the elastic member 260 may be supported on the fixing ring 258 of the shaft 250. The elastic member 260 may be configured to apply an elastic force to the second moving member 320 and the shaft 250 in the direction toward the outside from the second body 132.

The second moving member 320 may have one or more second cam surfaces 325 that are complementary to and mate with the first cam surface 315 of the first moving member 310, and the second cam surfaces 325 may have ridge portions and valley portions. The second moving member 320 may also have a plurality of second cam surfaces 325 following one after another in the circumferential direction.

As the cap 150 is pressed, the first moving member 310 may move downward, and the first cam surface 315 of the first moving member 310 and the second cam surfaces 325 of the second moving member 320 may make contact with each other. Accordingly, the second cam surfaces 325 of the second moving member 320 may slide relative to the first cam surface 315 of the first moving member 310 to rotate about the axis 103.

The guide structure 330 may include a linear guide part 331 configured to guide linear motion of the first moving member 310 and the second moving member 320 and a rotary guide part 333 configured to guide rotation of the second moving member 320 and stop the rotation of the second moving member 320. The linear guide part 331 may extend from the inside of the second body 132 along the axis 103 to guide the linear motion of the first moving member 310 and the second moving member 320.

Figure 9:
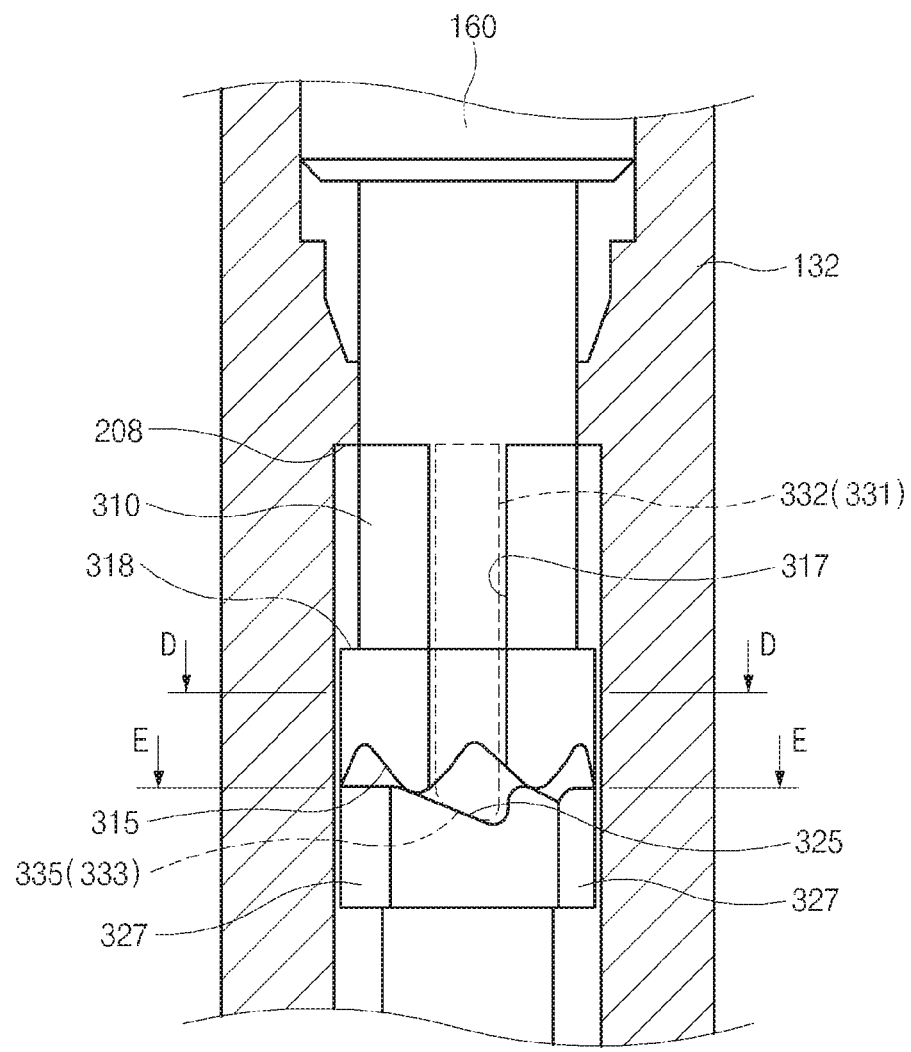
FIG. 9 illustrates a cam mechanism according to an embodiment of the present invention, where
Figure 10:
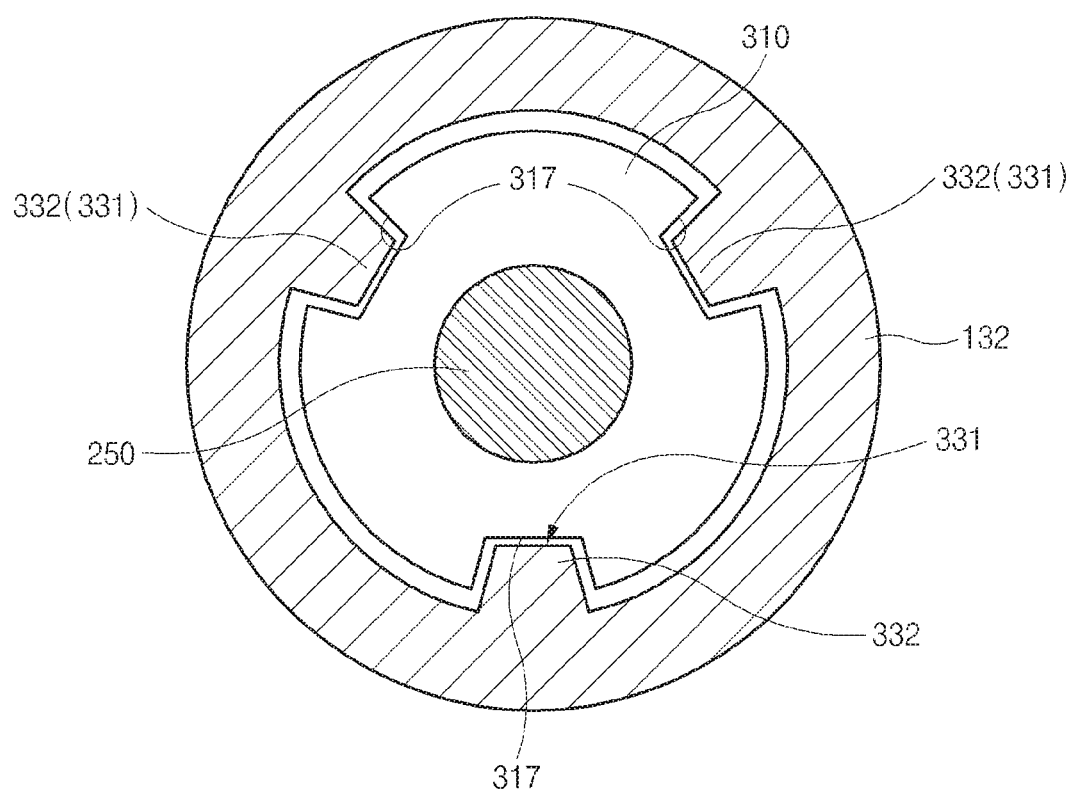
FIG. 10 is a sectional view taken along line D-D of FIG. 9.
Figure 11:
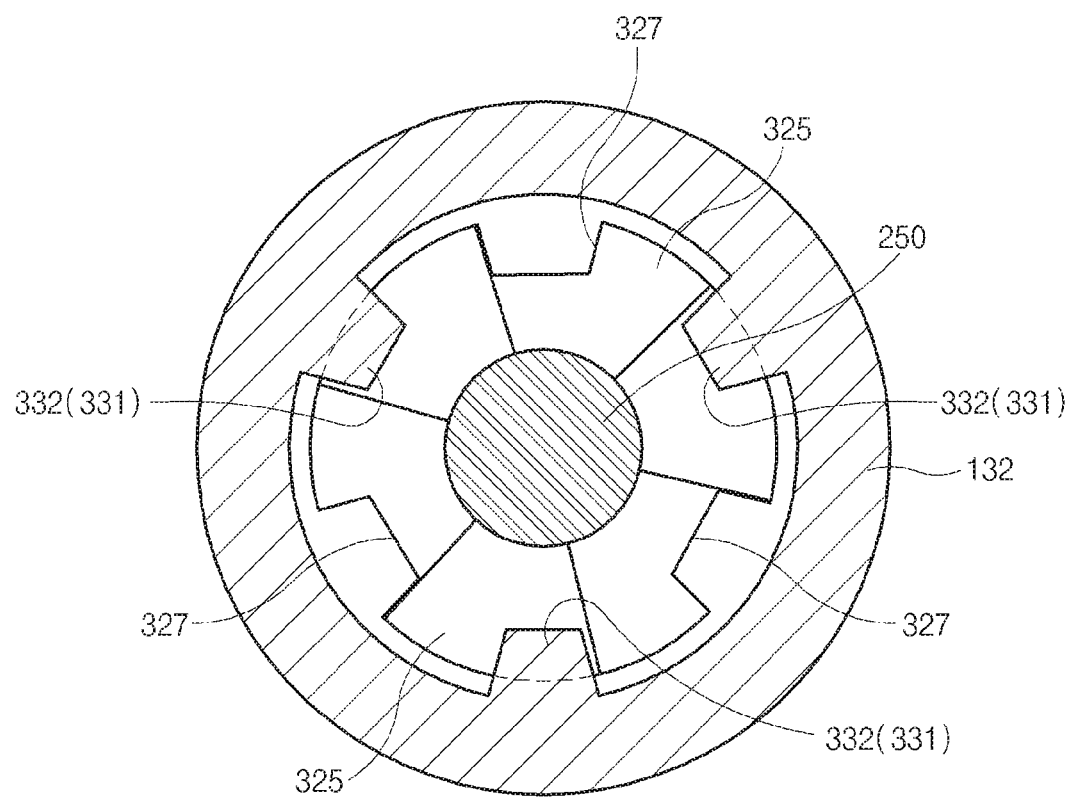
FIG. 11 is a sectional view taken along line E-E of FIG. 9.

According to an embodiment, as illustrated in FIGS. 9 to 17, the linear guide part 331 may be implemented with one or more guide rails 332 protruding inward from the inside of the case. In this regard, the first moving member 310 may have one or more first guide grooves 317 formed on the outer surface thereof and inserted into and guided by the guide rails 332, and the second moving member 320 may have one or more second guide grooves 327 formed on the outer surface thereof and inserted into and guided by the guide rails 332. As illustrated in FIGS. 10 and 11, the plurality of guide rails 332 may be spaced circumferentially apart from one another on the inside of the second body 132, and the plurality of first and second guide grooves 317 and 328 may be formed to correspond to the plurality of guide rails 332.

According to an embodiment, as illustrated in FIGS. 9 to 17, the rotary guide part 333 may be implemented with inclined surfaces 335 provided at lower ends of the guide rails 332, and the second cam surfaces 325 of the second moving member 320 may have a saw-tooth form to correspond to the inclined surfaces 335. Accordingly, when the inclined surfaces 335 make contact with inclined portions of the second cam surfaces 325, rotation of the second moving member 320 may be effectively guided, and when the inclined surfaces 335 are inserted into the valley portions of the second cam surfaces 325, the second moving member 320 may stop rotating.

An operation of the above-configured cam mechanism 300 according to an embodiment will be described below in detail with reference to FIGS. 9 to 17.

If the cap 150 is located at the first position P1, as illustrated in FIG. 27A, where the cap 150 is arranged with the lateral surface 13 of the housing 14 in the same plane, the first moving member 310 and the second moving member 320 may be spaced apart downward from a restriction step 208 by a predetermined distance, as illustrated in FIG. 9. In this case, the first guide grooves 317 of the first moving member 310 may be mounted on the guide rails 332, as illustrated in FIG. 10, and the second guide grooves 327 of the second moving member 320 may not be mounted on the guide rails 332, as illustrated in FIG. 11. Further, as illustrated in FIGS. 9 and 11, the inclined surfaces 335 may be stopped by the valley portions of the second cam surfaces 325 of the second moving member 320, and thus the second moving member 320 may stop rotating. As a result, the cap 150 may be maintained at the first position P1.

Figure 12:
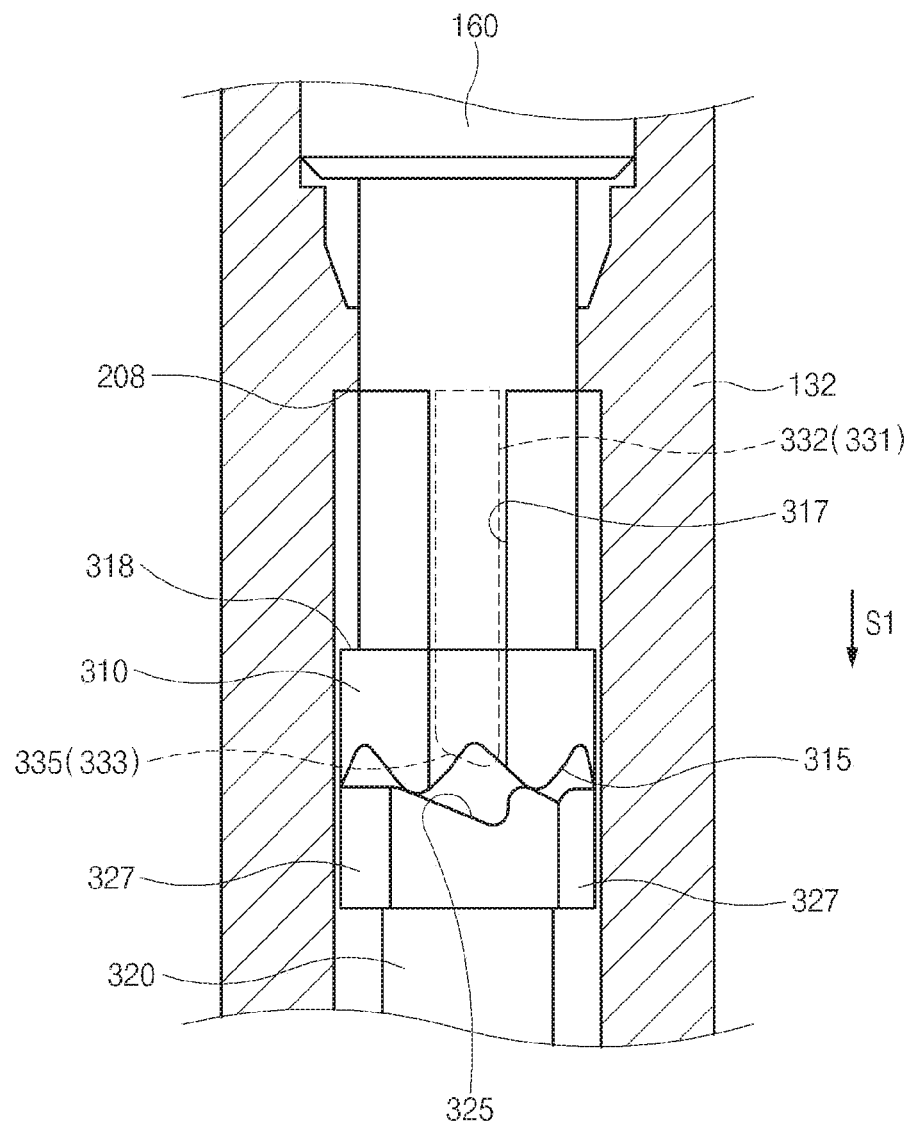
FIG. 12 illustrates a state in which a first moving member and a second moving member of a cam mechanism according to an embodiment of the present invention move downward.

If the cap 150 is pressed, the cap 150 may move to the second position P2, as illustrated in FIG. 27B, where the cap 150 makes contact with the upper end of the second body 132 and, as illustrated in FIG. 12, the first moving member 310 and the second moving member 320 may further move downward than in FIG. 9 (see arrow 51). Especially, the second guide grooves 327 of the second moving member 320 may move below the lower ends of the guide rails 332, that is, the inclined surfaces 335 in the state in which the second guide grooves 327 are not mounted on the guide rails 332. Accordingly, the second cam surfaces 325 of the second moving member 320 may be spaced apart from the inclined surfaces 335, and thus the second moving member 320 may be in a rotatable state.

Figure 13:
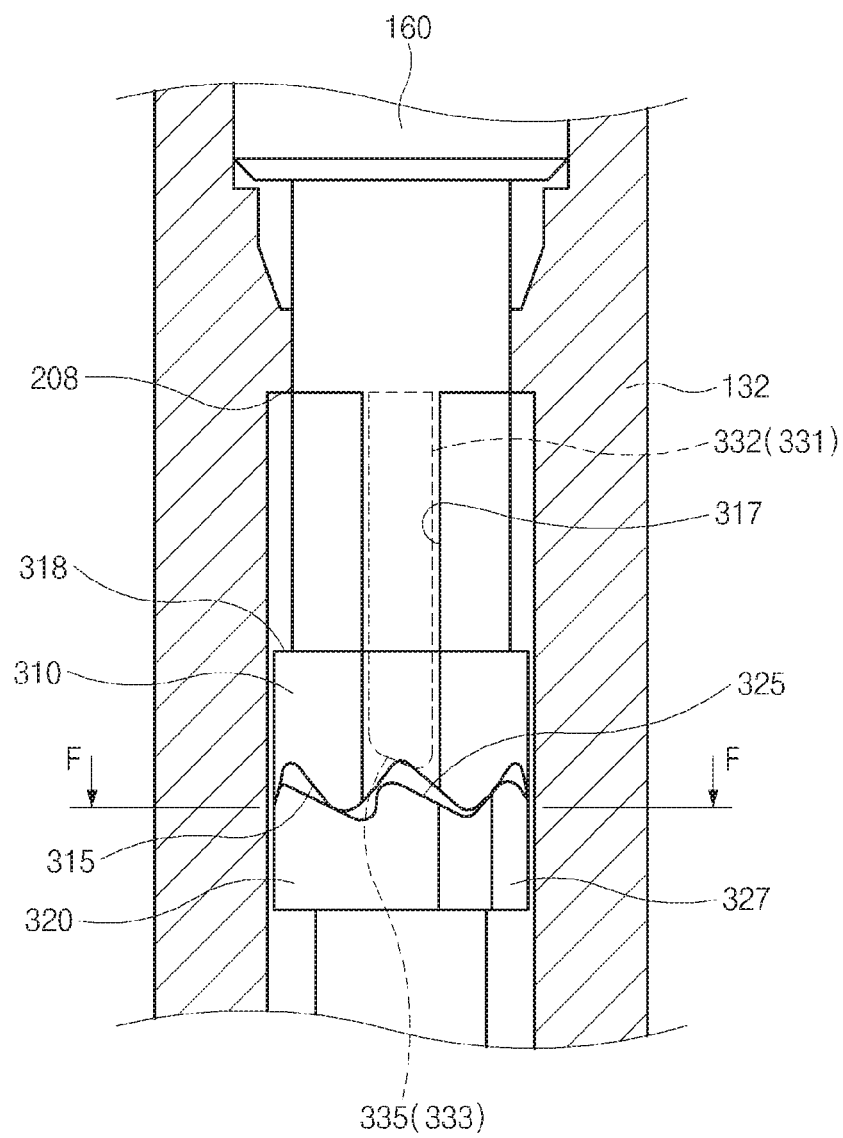
FIG. 13 illustrates a process in which a second moving member of a cam mechanism according to an embodiment of the present invention rotates.
Figure 14:
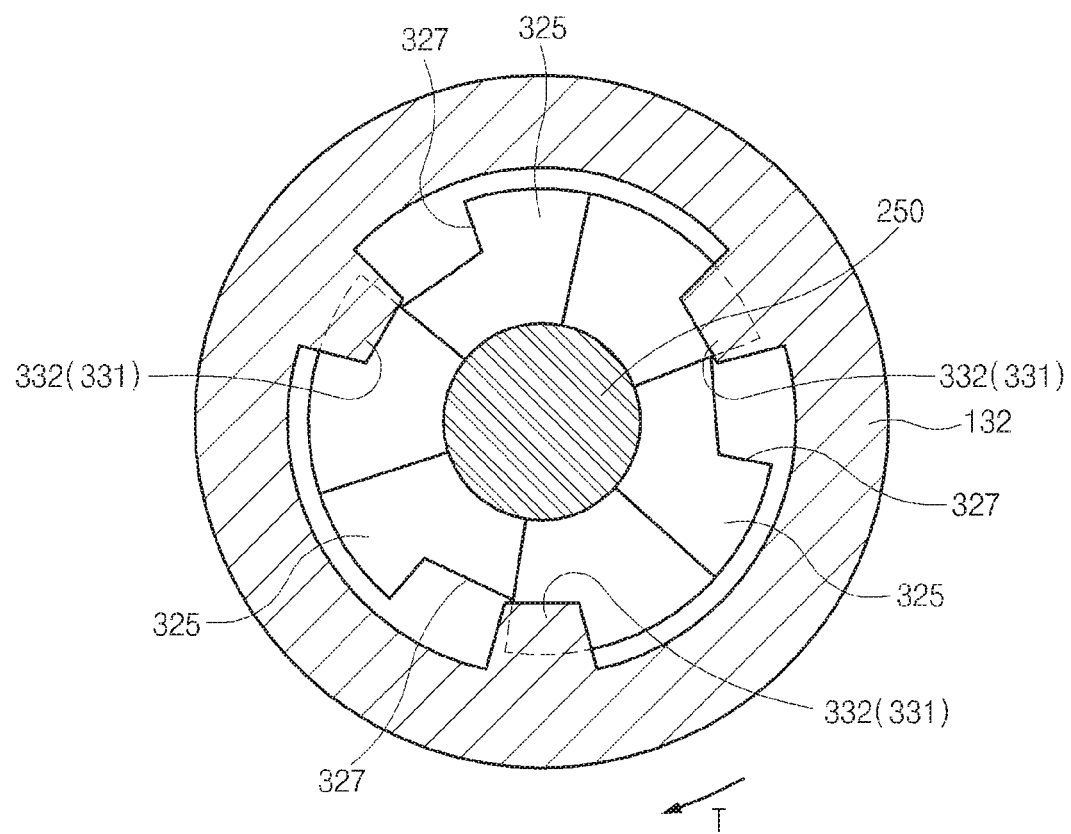
FIG. 14 is a sectional view taken along line F-F of FIG. 13.
Figure 15:
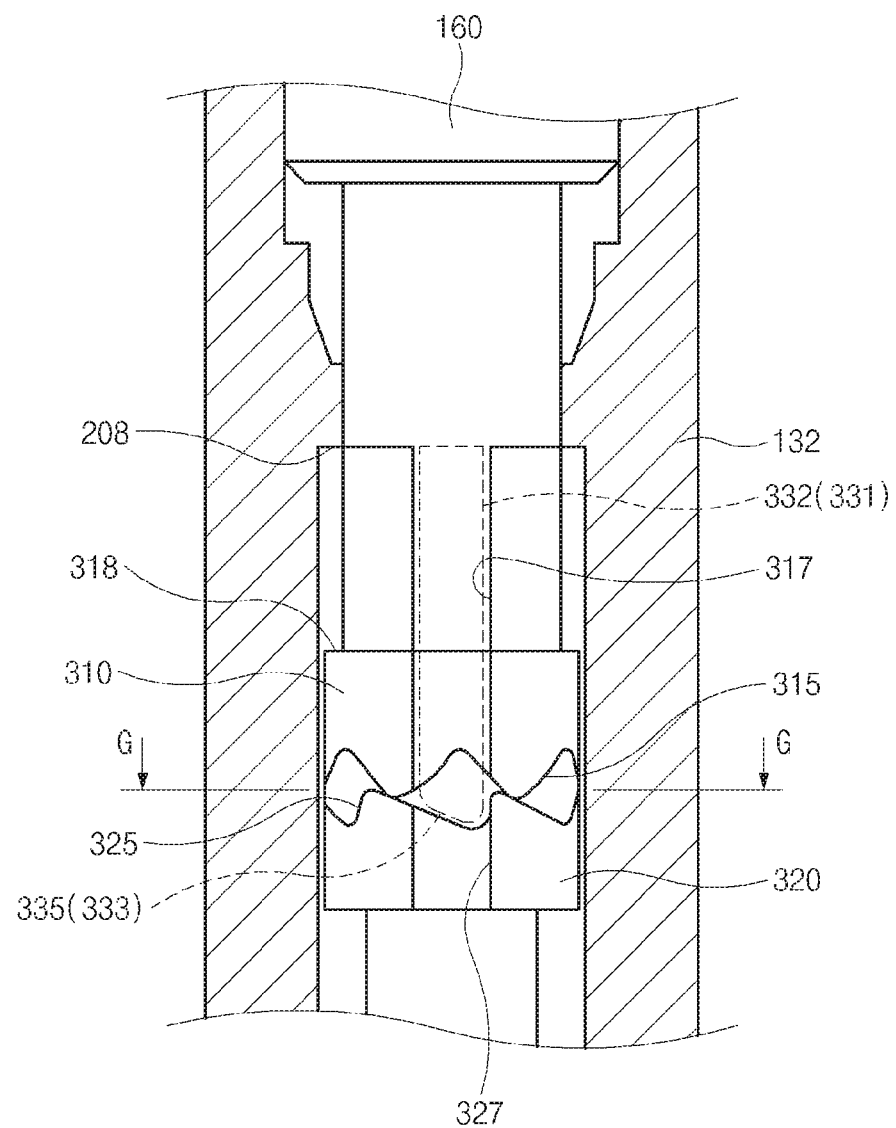
FIG. 15 illustrates a process in which a second moving member of a cam mechanism according to an embodiment of the present invention rotates.
Figure 16:
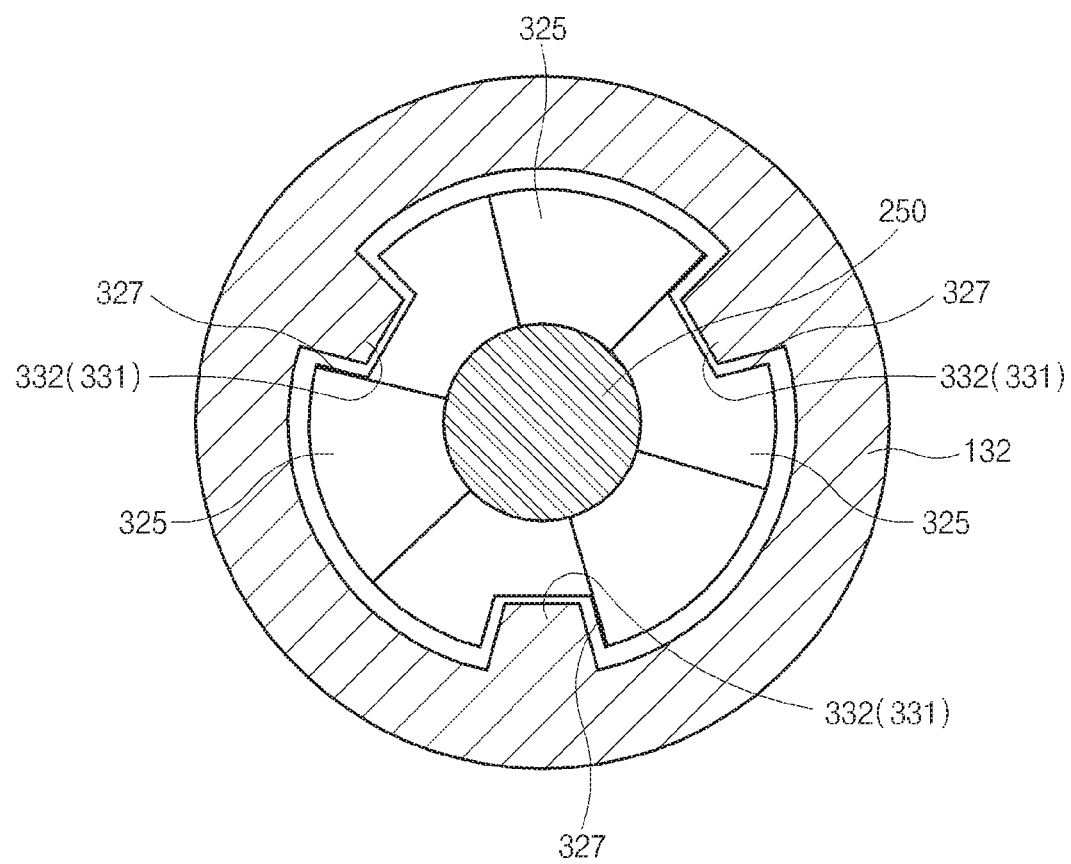
FIG. 16 is a sectional view taken along line G-G of FIG. 15.

In this state, as illustrated in FIGS. 13 and 14, the second cam surfaces 325 of the second moving member 320 and the first cam surface 315 of the first moving member 310 may slide relative to each other, and thus the second moving member 320 may rotate about the axis 103 (see the direction of arrow T). In this case, since the inclined surfaces 335 make contact with the inclined sections of the second cam surfaces 325, the second moving member 320 may more effectively rotate. Thereafter, the second cam surfaces 325 of the second moving member 320 and the first cam surface 315 of the first moving member 310 may continue to slide relative to each other, and thus the second guide grooves 327 of the second moving member 320 may be mounted on the guide rails 332 of the second body 132, as illustrated in FIG. 15.

Figure 17:
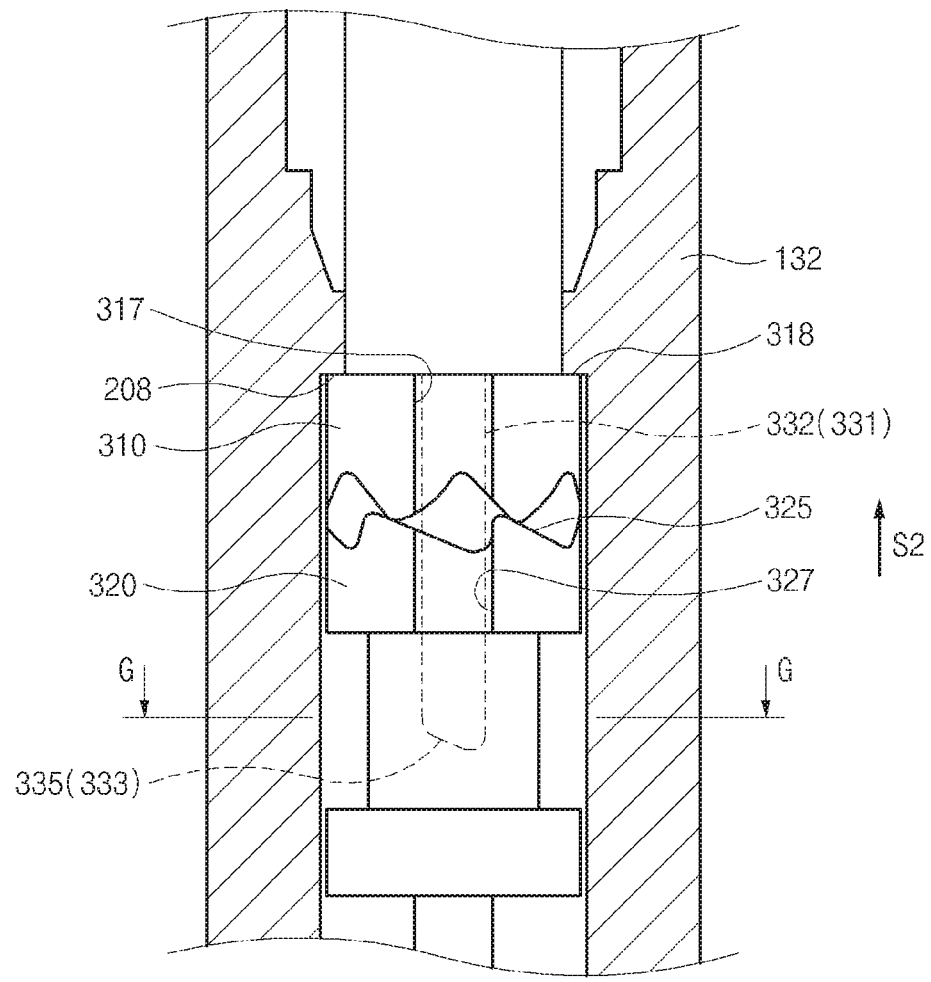
FIG. 17 illustrates a process in which a first moving member and a second moving member of a cam mechanism according to an embodiment of the present invention move upward.

If the first guide grooves 317 of the first moving member 310 and the second guide grooves 327 of the second moving member 320 are mounted on the guide rails 332 of the second body 132 in this way, the elastic force of the elastic member 260 may be applied to the second moving member 320, and the first moving member 310 and the second moving member 320 may move upward together, as illustrated in FIG. 17 (see arrow S2). Accordingly, the cap 150 connected to the first moving member 310 may move to the third position P3, as illustrated in FIG. 27C, where the cap 150 protrudes outside the storage space 18 of the housing 14, and the cap 150 may remain in the state in which the cap 150 has protruded from the storage space 18 of the housing 14.

According to another embodiment, as illustrated in FIGS. 18 to 26, the linear guide part 331 may be implemented with one or more guide grooves 334 formed on the inside of the second body 132. In this regard, the first moving member 310 may have, on the outside thereof, one or more first guide protrusions 319 inserted into and guided by the guide grooves 334, and the second moving member 320 may have, on the outside thereof, one or more second guide protrusions 329 inserted into and guided by the guide grooves 334. Upper ends of the second guide protrusions 329 may be formed in a structure corresponding to the shape of the second cam surfaces 325.

Figure 19:
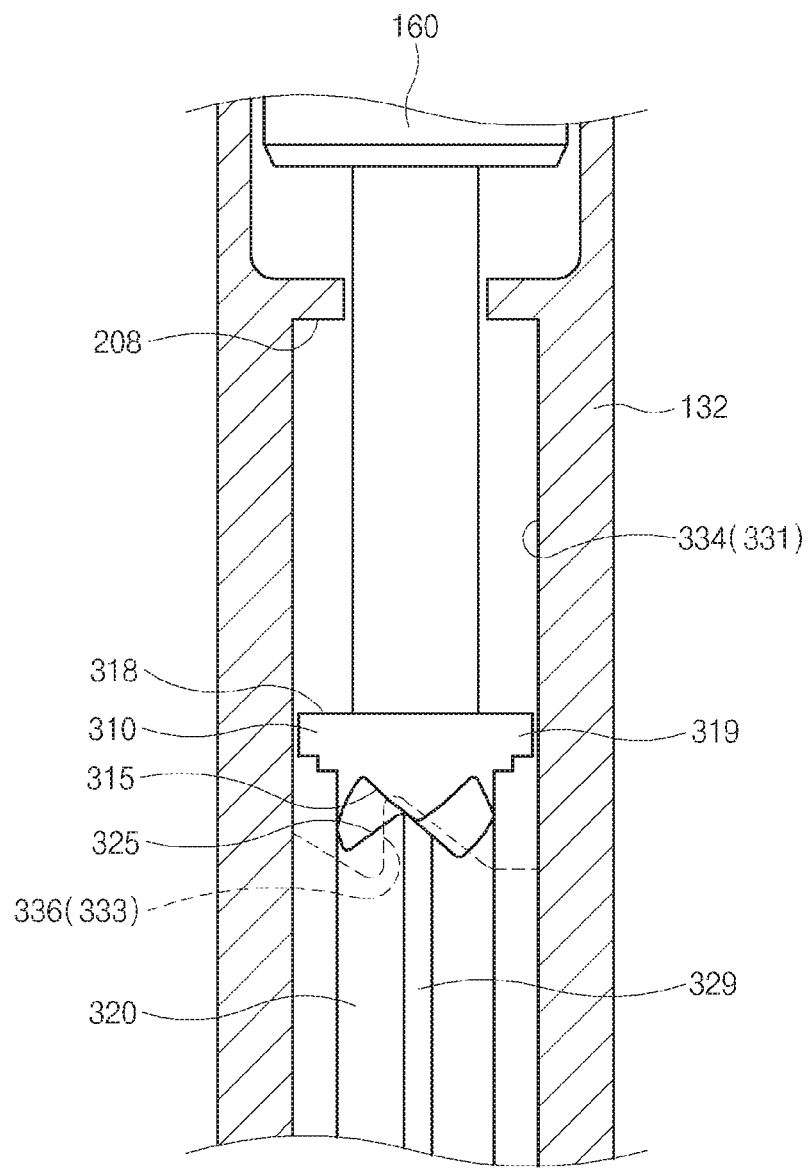
FIG. 19 is a sectional view taken along line J-J of FIG. 18.
Figure 20:
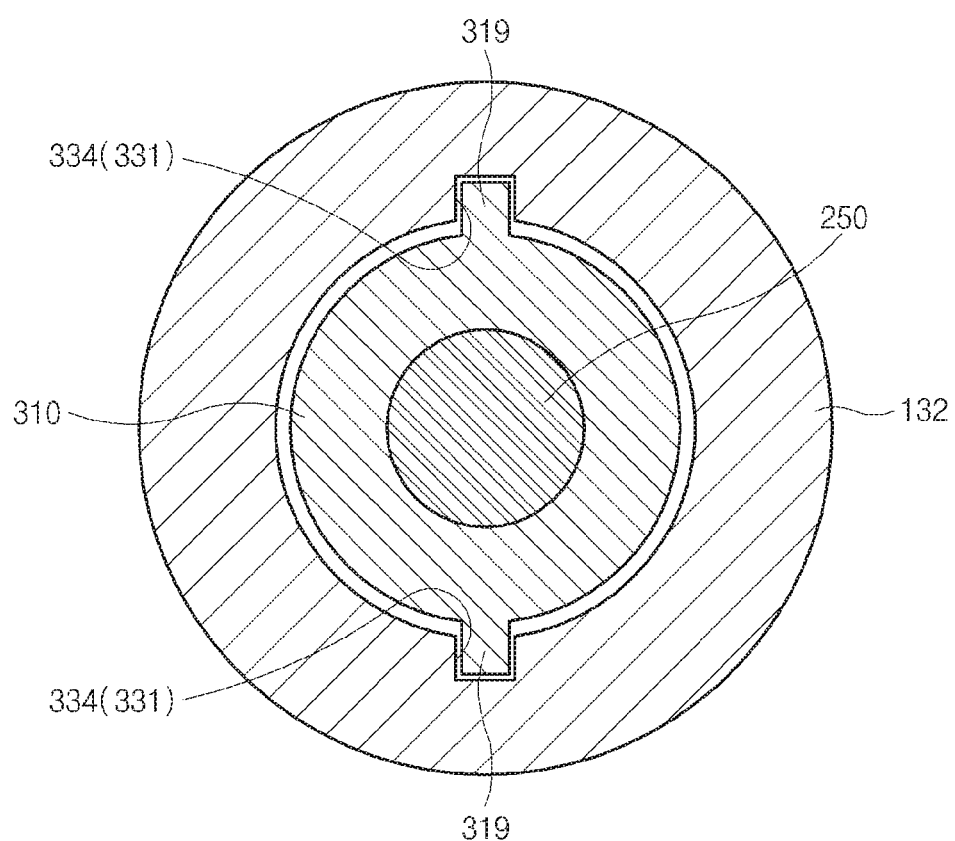
FIG. 20 is a sectional view taken along line H-H of FIG. 18.
Figure 21:
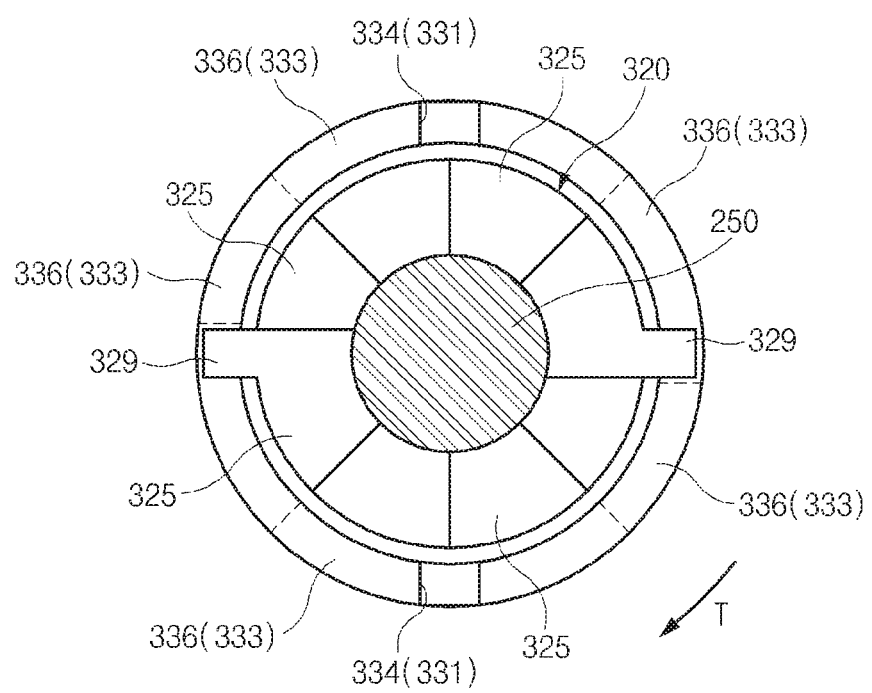
FIG. 21 is a sectional view taken along line I-I of FIG. 18.

As illustrated in FIGS. 20 and 21, the plurality of guide grooves 334 may be spaced circumferentially apart from one another on the inside of the second body 132, and the plurality of first guide protrusions 319 and the plurality of second guide protrusions 329 may be formed to correspond to the plurality of guide grooves 334. According to another embodiment, as illustrated in FIGS. 18 to 26, the rotary guide part 333 may be implemented with a plurality of saw-tooth forms 336 provided at lower ends of the guide grooves 334.

The plurality of saw-tooth forms 336 may be continuously formed in the circumferential direction to guide rotation of the second guide protrusions 329 of the second moving member 320. Accordingly, if the second guide protrusions 329 of the second moving member 320 are separated from the guide grooves 334 of the second body 132, the second guide protrusions 329 may make contact with the plurality of saw-tooth forms 336, and thus rotation of the second moving member 320 may be guided, and if upper ends of the second guide protrusions 329 of the second moving member 320 are inserted into valley portions of the saw-tooth forms 336, the second moving member 320 may stop rotating. As described above, the second moving member 320 may stop rotating and may be stationary at a specific position if the upper ends of the second guide protrusions 329 are inserted into the valley portions of the saw-tooth forms 336 after the second guide protrusions 329 of the second moving member 320 are separated from the guide grooves 334.

An operation of the above-configured cam mechanism 300 according to another embodiment will be described below in detail with reference to FIGS. 18 to 25.

Figure 18:
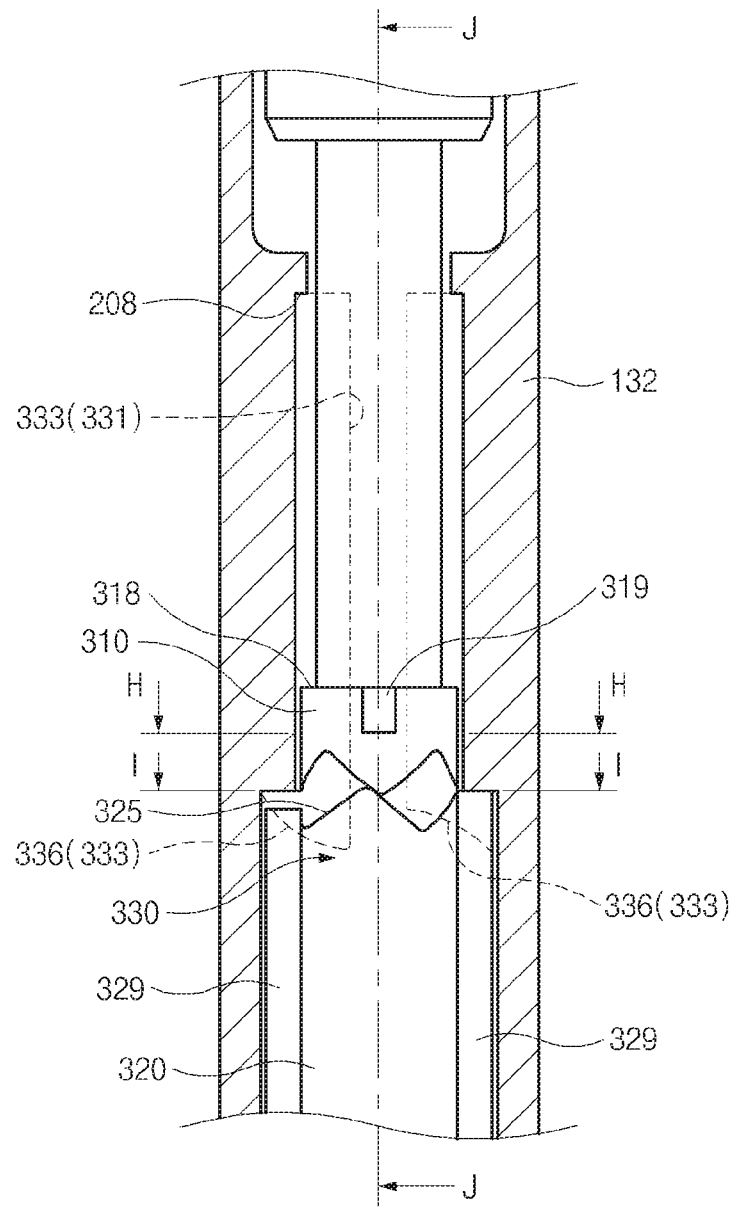
FIG. 18 illustrates a cam mechanism according to another embodiment of the present invention.

If the cap 150 is located at the first position P1, as illustrated in FIG. 27A, where the cap 150 is arranged with the lateral surface 13 of the housing 14 in the same plane, the first moving member 310 and the second moving member 320 may be spaced apart downward from the restriction step 208 by a predetermined distance, as illustrated in FIGS. 18 and 19. In this case, as illustrated in FIG. 20, the first guide protrusions 319 of the first moving member 310 may be inserted into the guide grooves 334 of the second body 132 and, as illustrated in FIGS. 19 and 21, the upper ends of the second guide protrusions 329 of the second moving member 320 may be stopped by the valley portions of the saw-tooth forms 336 so that the second moving member 320 may be prevented from rotating and thus the cap 150 may remain at the position P1.

Figure 22:
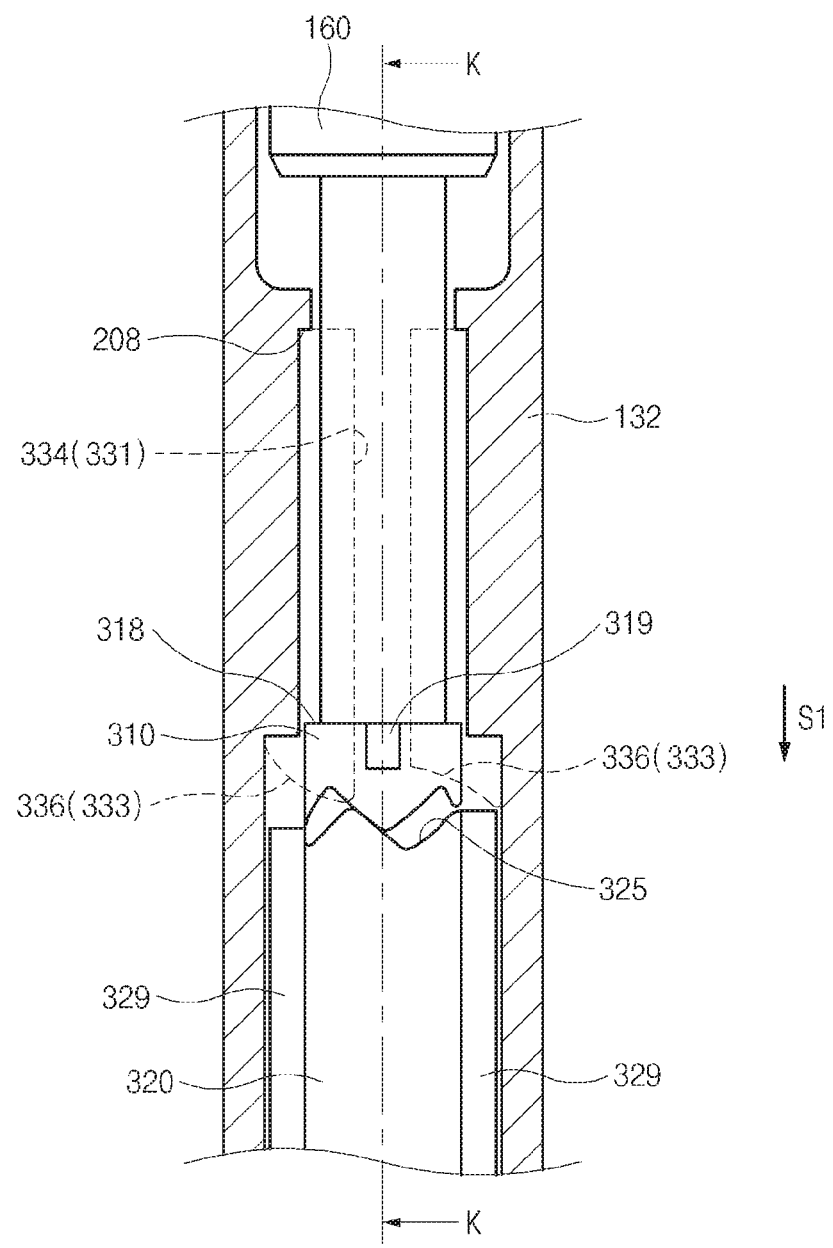
FIG. 22 illustrates a process in which a first moving member and a second moving member of a cam mechanism according to another embodiment of the present invention move downward.
Figure 23:
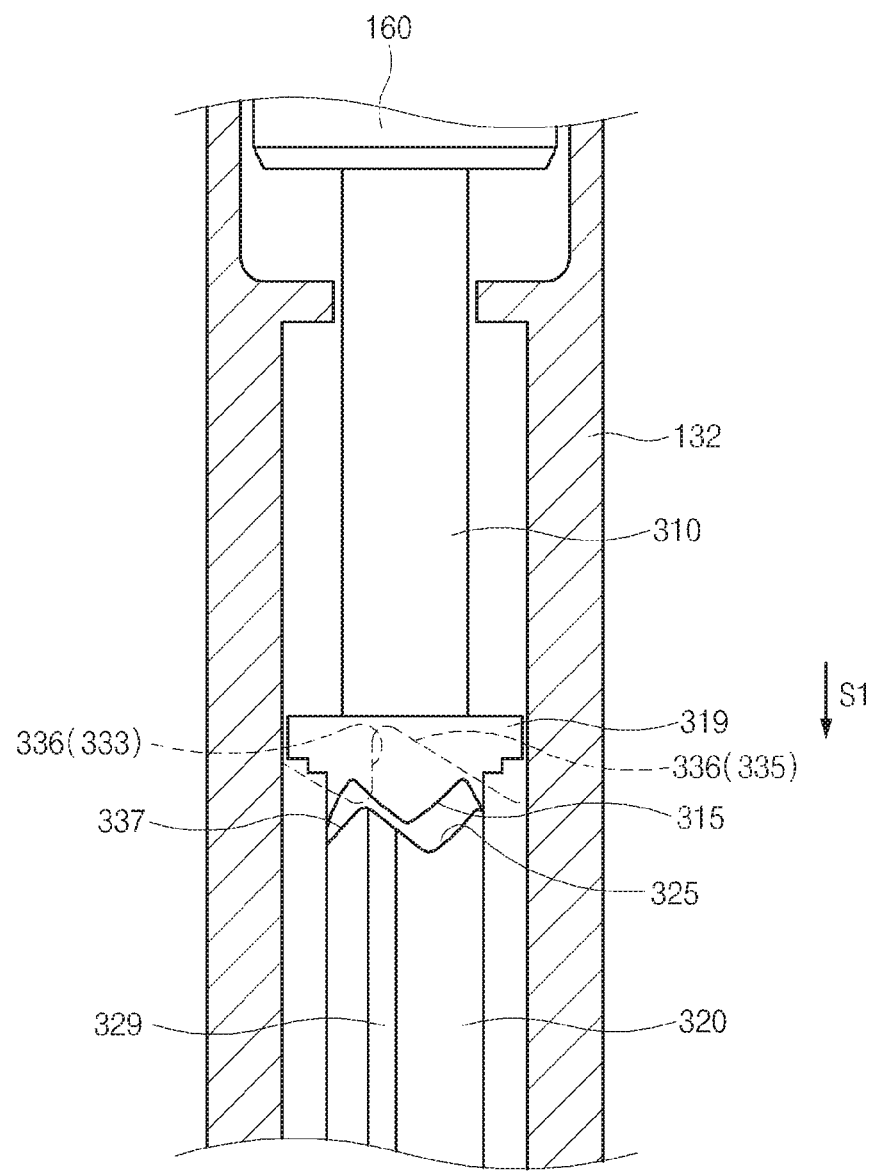
FIG. 23 is a sectional view taken along line K-K of FIG. 22.

If the cap 150 is pressed, the cap 150 may move to the second position P2, as illustrated in FIG. 27B, where the cap 150 makes contact with the upper end of the second body 132 and, as illustrated in FIGS. 22 and 23, the first moving member 310 and the second moving member 320 may further move downward than in FIGS. 18 and 19 (see arrow 51). As the second guide protrusions 329 of the second moving member 320 move below the lower ends of the guide grooves 334, that is, the saw-tooth forms 336, the upper ends of the second guide protrusions 329 of the second moving member 320 may be separated from the valley portions of the saw-tooth forms 336, and thus the second moving member 320 may be in a rotatable state.

Figure 24:
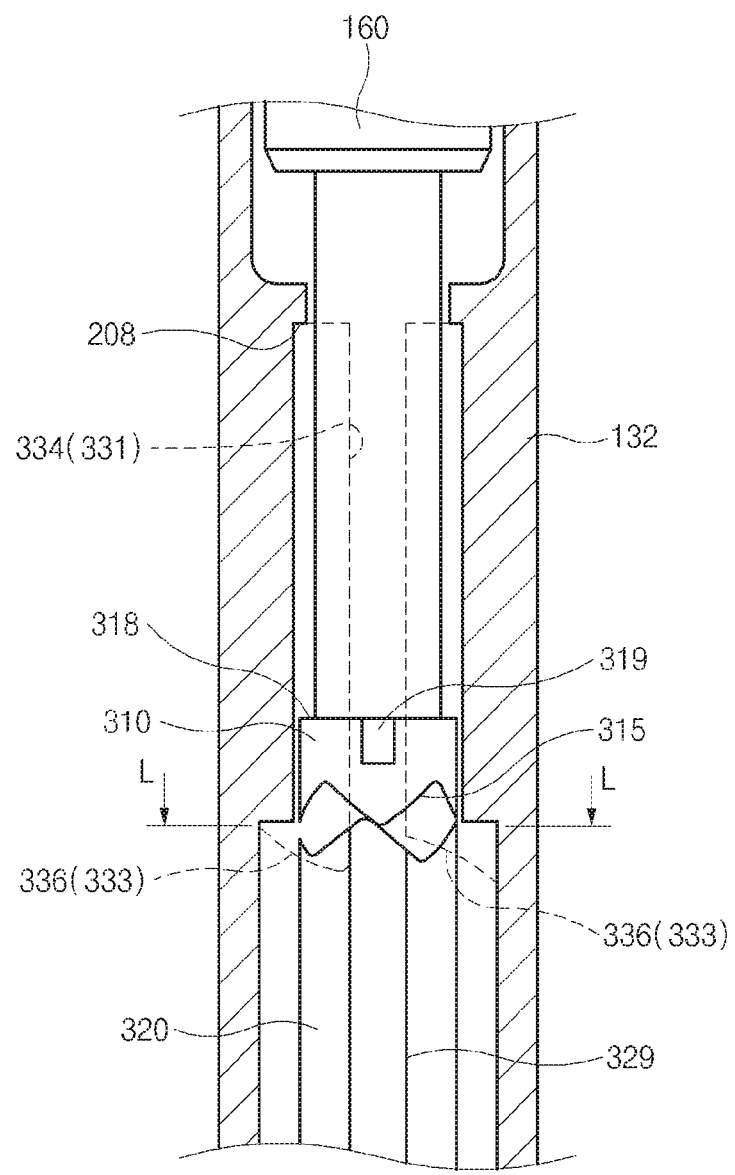
FIG. 24 illustrates a process in which a second moving member of a cam mechanism according to another embodiment of the present invention rotates.
Figure 25:
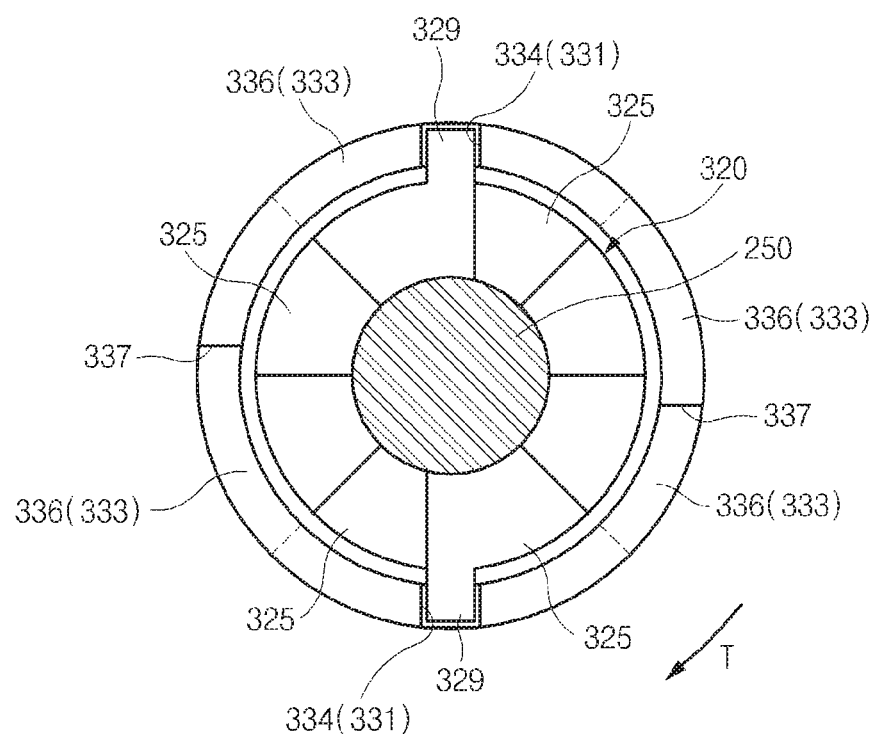
FIG. 25 is a sectional view taken along line L-L of FIG. 24.

In this state, the second cam surfaces 325 of the second moving member 320 and the first cam surface 315 of the first moving member 310 may slide relative to each other, and thus the second moving member 320 may rotate about the axis 103 (see the direction of arrow T in FIG. 21). In this case, since inclined sections of the saw-tooth forms 336 make contact with inclined sections of the second cam surfaces 325, the second moving member 320 may more effectively rotate. Thereafter, the second cam surfaces 325 of the second moving member 320 and the first cam surface 315 of the first moving member 310 may continue to slide relative to each other, and thus the second guide protrusions 329 of the second moving member 320 may be inserted into the guide grooves 334, as illustrated in FIGS. 24 and 25.

Figure 26:
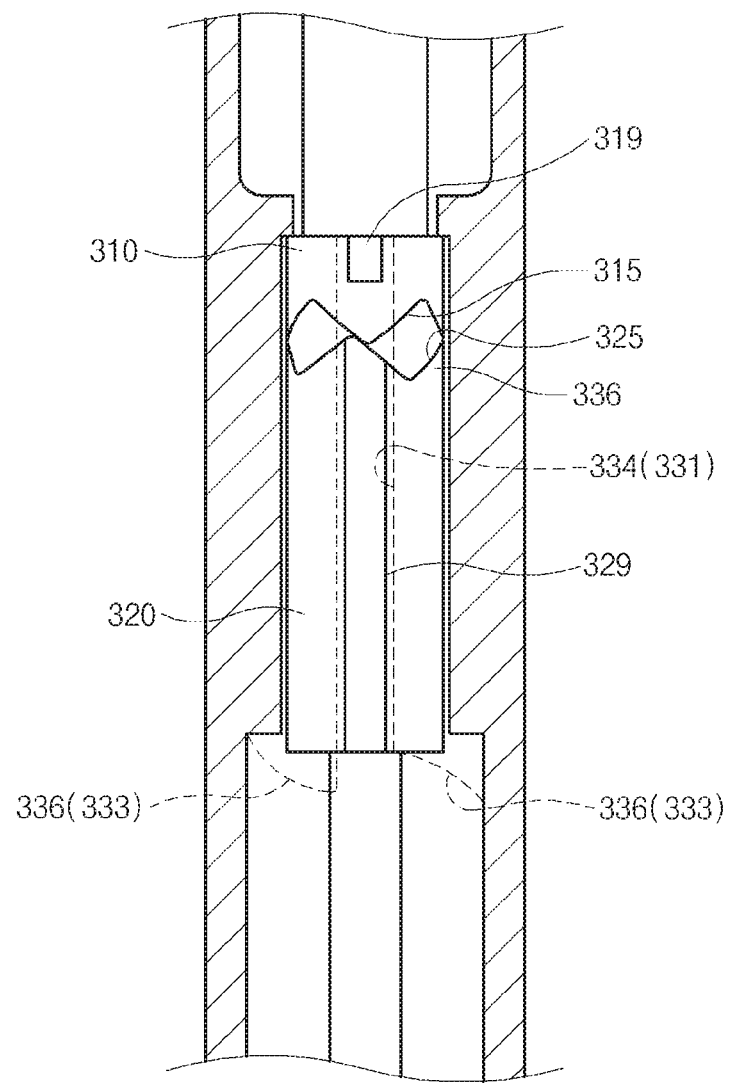
FIG. 26 illustrates a process in which a first moving member and a second moving member of a cam mechanism according to an embodiment of the present invention move upward.

If the first guide protrusions 319 of the first moving member 310 and the second guide protrusions 329 of the second moving member 320 are inserted into the guide grooves 334 in this way, the elastic force of the elastic member 260 may be applied to the second moving member 320, and the first moving member 310 and the second moving member 320 may move upward together, as illustrated in FIG. 26 (see arrow S2). Accordingly, the cap 150 connected to the first moving member 310 may move to the third position P3, as illustrated in FIG. 27C, where the cap 150 protrudes outside the storage space 18 of the housing 14, and the cap 150 may remain in the state in which the cap 150 has protruded from the storage space 18 of the housing 14.

According to various embodiments, the stylus pen 100 may include a restriction structure configured to limit a movement of some elements of the variable length unit 200 and/or the cap 150 when the length of the stylus pen 100 is varied by the variable length unit 200. According to various embodiments of the restriction structure, as illustrated in FIG. 6, a step 318 may be formed on a side of the first moving member 310, and the restriction step 208 by which the step 318 of the first moving member 310 is stopped may be formed on the inside of the second body 132. The restriction step 208 may protrude inward from the inside of the second body 132 in the radial direction. Accordingly, when the first moving member 310 moves in the direction of arrow V1 in FIG. 7, the step 318 of the first moving member 310 may be stopped by the restriction step 208 so that the movement of the first moving member 310 may be limited and a movement of the cap 150 connected to the first moving member 310 may also be limited. As a result, when the cap 150 protrudes outward through the opening 19 of the storage space 18 as illustrated in FIG. 27C, the protruding length of the cap 150 may be restricted to a set range. Further, since the second moving member 320 is secured to one side of the shaft 250 through the fixing ring 258, as illustrated in FIGS.

5 to 7, and the fixing ring 258 is elastically supported by the elastic member 260, when the second moving member 320 moves in the direction of arrow V2 in FIG. 7, the movement of the second moving member 320 may be limited by the elastic force of the elastic member 260.

Referring to FIGS. 5 and 6, the shaft 250 may pass through the first moving member 310 and the second moving member 320, the second moving member 320 may be secured to one side of the shaft 250, and the first moving member 310 may be connected to the cap 150 through the mounting member 160 and the cap holder 153. Accordingly, the first moving member 310 and the second moving member 320 may move relative to each other along the axis 103. For example, as illustrated in FIG. 7, as the first cam surface 315 and the second cam surfaces 325 slide relative to each other, the first moving member 310 and the second moving member 320 may move relative to each other in the directions (arrows V1 and V2 in FIG. 7) in which the first and second moving members 310 and 320 become closer to each other or in the directions (arrows X1 and X2 in FIG. 7) in which the first and second moving members 310 and 320 move away from each other.

In this case, if the relative distance between the first moving member 310 and the second moving member 320 is not restricted to a predetermined range, the cap 150 connected to the first moving member 310 may randomly move at the opening 19 of the storage space 18. For example, in the case where the cap 150 randomly moves at the opening 19 of the storage space 18 in FIGS. 27A to 27C, the external appearance may be degraded and the cap 150 may be damaged. To solve these problems, the restriction structure according to various embodiments of the present invention may further include a restriction unit 400 configured to restrict the relative distance between the first moving member 310 and the second moving member 320 to a predetermined range.

According to various embodiments, the restriction unit 400 may include a connecting member 410 configured to elastically connect the first moving member 310 and the second moving member 320. As illustrated in FIGS. 5 to 7, the connecting member 410 may be configured to elastically connect the shaft 250 and the first moving member 310. Specifically, the second moving member 320 may be secured to the shaft 250 through the fixing ring 258, the opposite end portion of the shaft 250 may be inserted into the first moving member 310, and the shaft 250 and the first moving member 310 may be elastically connected together through the connecting member 410. Since the first moving member 310 is elastically connected to the opposite end portion of the shaft 250, the first moving member 310 may be maintained at a predetermined distance from the shaft 250, and thus the relative moving distance between the first moving member 310 and the second moving member 320 may be restricted to a predetermined range. According to various embodiments, the connecting member 410 may be formed of an elastic material, such as a spring, rubber, or the like, which is extensible between the shaft 250 and the first moving member 310 along the axis 103.

An installation structure for the connecting member 410 will be described below in more detail. As illustrated in FIGS. 5 to 7, the shaft 250 may have a stopper 251 protruding outward from the opposite end portion thereof in the radial direction, the opposite end portion of the shaft 250 may be inserted into the first moving member 310, and the first moving member 310 may have a support step 316 formed on the inside thereof. The connecting member 410 may be installed between the stopper 251 of the shaft 250 and the support step 316 of the first moving member 310, and thus the shaft 250 and the first moving member 310 may be elastically connected together. Furthermore, since the shaft 250 is secured to the second moving member 320 through the fixing ring 258, the first moving member 310 and the second moving member 320 may be elastically connected along the axis 103 through the connecting member 410. Since the connecting member 410 is formed of an elastic material elastically connecting the first moving member 310 and the shaft 250 in the direction of the axis 103 as described above, the first moving member 310 may be restricted to maintain a predetermined distance from the second moving member 320.

A structure in which the distance between the first moving member 310 and the second moving member 320 is restricted to a predetermined range will be described below in detail with reference to FIG. 7.

If the first moving member 310 moves in the direction of arrow V1 as the first cam surface 315 of the first moving member 310 and the second cam surfaces 325 of the second moving member 320 slide relative to each other, the first moving member 310 may be restricted toward the shaft 250 and the second moving member 320 by an elastic force that the connecting member 410 applies to the first moving member 310 in the direction of arrow X1, and thus the distance between the first moving member 310 and the second moving member 320 may be maintained with a predetermined range.

If the second moving member 320 moves in the direction of arrow V2 as the first cam surface 315 of the first moving member 310 and the second cam surfaces 325 of the second moving member 320 slide relative to each other, the second moving member 320 may be restricted toward the first moving member 310 by an elastic force that the connecting member 410 applies to the second moving member 320 in the direction of arrow X2, and thus the distance between the first moving member 310 and the second moving member 320 may be maintained with a predetermined range.

Further, since the relative moving distance between the first moving member 310 and the second moving member 320 is restricted to a predetermined range by the restriction unit 400, the cap 150 connected to the first moving member 310 may be effectively prevented from randomly moving to the outside from the opening 19 of the storage space 18, and thus the cap 150 may stably remain at the first position P1 (see FIG. 27A) where the cap 150 is arranged with the lateral surface 13 of the housing 14 in the same plane and at the third position P3 (see FIG. 27B) where the cap 150 protrudes from the lateral surface 13 of the housing 14.

According to various embodiments, the restriction unit 400 may be configured to allow a relative motion between the first moving member 310 and the second moving member 320 while maintaining contact between the first cam surface 315 of the first moving member 310 and the second cam surfaces 325 of the second moving member 320. For example, even though the first moving member 310 and the second moving member 320 move in the directions of arrows V1 and V2 in FIG. 7, respectively, the first cam surface 315 of the first moving member 310 and the second cam surfaces 325 of the second moving member 320 may maintain contact therebetween. To this end, the connecting member 410 may be formed of an elastic material, such as a spring, rubber, or the like, which has a modulus of elasticity sufficient to maintain contact between the first cam surface 315 and the second cam surfaces 325. Since the connecting member 410 is configured to maintain contact between the first cam surface 315 of the first moving member 310 and the second cam surfaces 325 of the second moving member 320, as described above, the first cam surface 315 of the first moving member 310 and the second cam surfaces 325 of the second moving member 320 may more effectively slide relative to each other.

As described above, according to various embodiments, an electronic device may include a housing that includes a first surface facing a first direction, a second surface facing a second direction opposite to the first direction, and a lateral surface surrounding at least part of a space formed between the first surface and the second surface, an opening formed in one portion of the lateral surface of the housing, a storage space extending from the opening, with an axis as a center of the storage space, and a stylus pen that includes a first end surface including a touch tip and a second end surface opposite to the first end surface and has a length by which the entirety of the stylus pen is received in the storage space, the second end surface being arranged with another portion of the lateral surface of the housing in substantially the same plane in a case where the entirety of the stylus pen is received in the storage space, and the stylus pen being configured to be removable from the storage space. The second end surface of the stylus pen may be configured to protrude outside the storage space from the opening in a direction of the axis in response to external pressure.

According to various embodiments, an electronic device may include a housing that includes a first surface facing a first direction, a second surface facing a second direction opposite to the first direction, and a lateral surface surrounding at least part of a space formed between the first surface and the second surface, an opening formed in one portion of the lateral surface of the housing, a storage space extending from the opening, and a stylus pen that includes a first end portion including a touch tip and a second end portion opposite to the first end portion and has a length by which the entirety of the stylus pen is received in the storage space, the second end portion being arranged with another portion of the lateral surface of the housing in substantially the same plane in a case where the entirety of the stylus pen is received in the storage space, and the stylus pen being configured to be removable from the storage space. The second end portion of the stylus pen may include a cap configured to be pressed toward the storage space from outside the housing.

According to various embodiments, the cap may have a first width when viewed from above the storage space, and the stylus pen may have a second width smaller than the first width when viewed from above the storage space.

According to various embodiments, the stylus pen may further include a shaft that is movable into an inner space of the stylus pen, and the cap may be connected to the shaft.

According to various embodiments, the stylus pen may further include an elastic member configured to elastically support the shaft.

According to various embodiments, the cap may protrude outside the opening according to a movement of the shaft in a case where the cap is pressed.

According to various embodiments, one or more radiators constituting an antenna may be provided on a lateral surface of the housing, a cut-off portion may be provided on at least one end of the radiators, and the storage space may be disposed adjacent to the cut-off portion.

According to various embodiments, a stylus pen configured to provide an input to an electronic device may include a pen body formed with respect to an axis and including an outer surface and an inner surface, wherein the pen body extends in a direction of the axis, a cap disposed on one end of the pen body, a first structure configured to make contact with at least a portion of the inner surface of the pen body and to change in length in the direction of the axis in response to pressure applied to the cap, a second structure configured to make contact with at least a part of the first structure and to limit a movement of the cap and/or the first structure in the direction of the axis, and a touch tip disposed on an opposite end of the pen body.

According to various embodiments, the first structure may include a shaft movable along the axis in an inner space adjacent to the opposite end of the pen body.

According to various embodiments, the first structure may further include an elastic member configured to elastically support the shaft.

According to various embodiments, the first structure may further include a cam mechanism configured to move the shaft along the axis in cooperation with the elastic member.

According to various embodiments, the cam mechanism may include a first moving member configured to linearly move along the axis as an external force is applied to the cap, and a second moving member configured to rotate while linearly moving together with the linear movement of the first moving member.

According to various embodiments, the first moving member may have one or more cam surfaces, and the second moving member may have one or more second cam surfaces that slide relative to the first cam surfaces.

According to various embodiments, the cam mechanism may further include a guide structure configured to guide the movement of the first moving member and the second moving member.

According to various embodiments, the guide structure may include a linear guide part provided on the inner surface of the pen body to guide the linear movement of the first moving member and the second moving member; and a rotary guide part configured to guide the rotary motion of the second moving member.

According to various embodiments, the first moving member may be connected to the cap.

According to various embodiments, the second structure may include a restriction step configured to limit a movement of at least one of the cap and the first moving member.

According to various embodiments, the second structure may further include a restriction unit configured to limit a relative moving distance between the first moving member and the second moving member.

According to various embodiments, the restriction unit may include a connecting member configured to elastically connect the first moving member and the second moving member.

Figure 30:
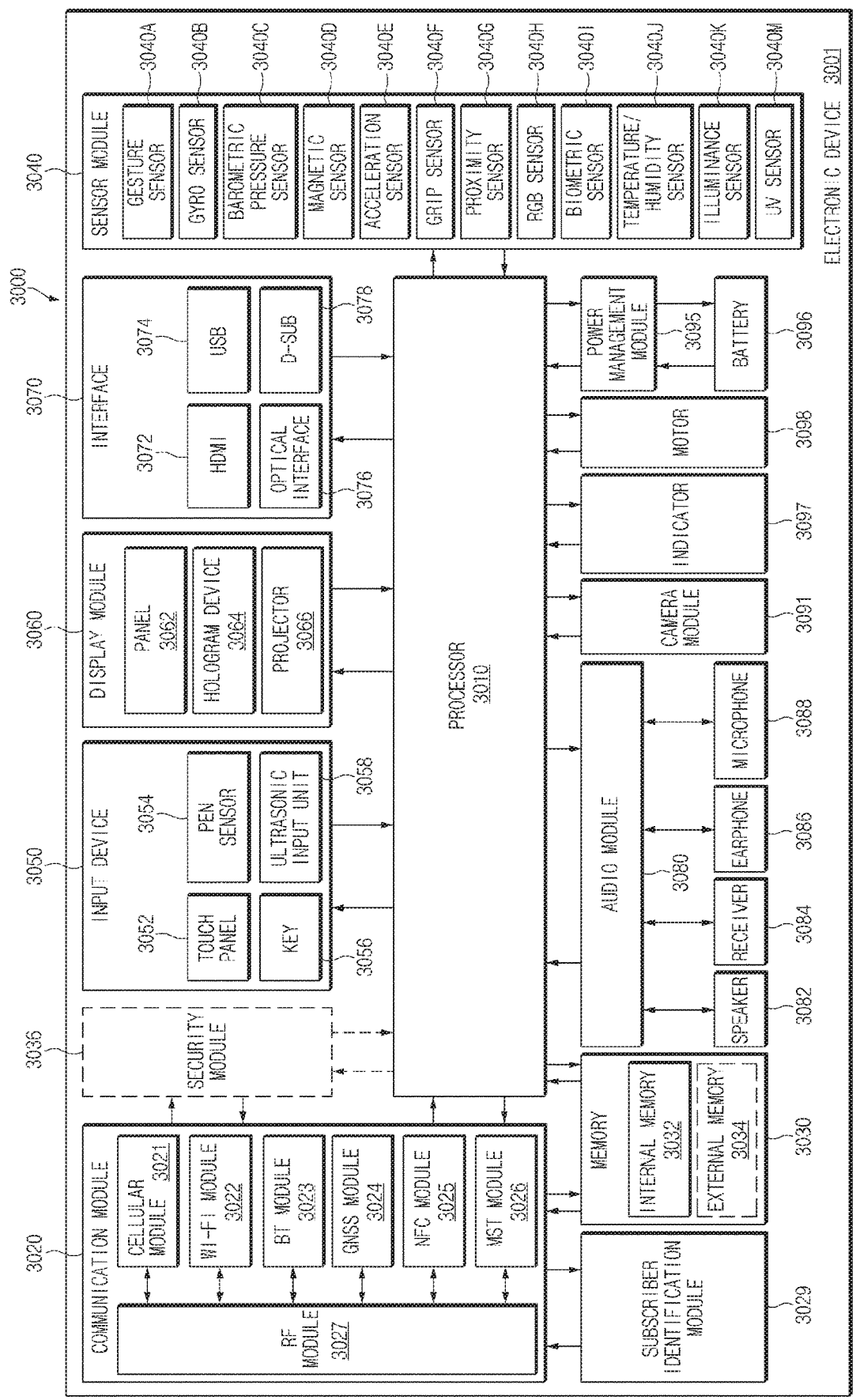
FIG. 30 is a block diagram of an electronic device according to various embodiments.

FIG. 30 is a block diagram of an electronic device 3001 according to various embodiments. The electronic device 3001 may include all or a part of the electronic device in which the stylus pen 100 is removably received, as described above. The electronic device 3001 may include at least one processor (e.g., application processor (AP)) 3010, a communication module 3020, a subscriber identification module 3029, a memory 3030, a sensor module 3040, an input device 3050, a display module 3060, an interface 3070, an audio module 3080, a camera module 3091, a power management module 3095, a battery 3096, an indicator 3097, and a motor 3098.

The processor 3010 may drive, for example, an operating system (OS) or an application program to control a plurality of hardware or software components connected thereto and may process and compute a variety of data. The processor 3010 may be implemented with, for example, a system on chip (SoC). According to an embodiment of the present disclosure, the processor 3010 may include a graphic processing unit (GPU) (not shown) and/or an image signal processor (not shown). The processor 3010 may include at least some (e.g., a cellular module 3021) of the components shown in FIG. 30. The processor 3010 may load a command or data received from at least one of other components (e.g., a non-volatile memory) into a volatile memory to process the data and may store various data in a non-volatile memory.

The communication module 3020 may include, for example, the cellular module 3021, a wireless-fidelity (Wi-Fi) module 3022, a Bluetooth (BT) module 3023, a global navigation satellite system (GNSS) module 3024 (e.g., a GPS module, a Glonass module, a Beidou module, or a Galileo module), a near field communication (NFC) module 3025, an MST module 3026, and a radio frequency (RF) module 3027.

The cellular module 3021 may provide, for example, a voice call service, a video call service, a text message service, or an Internet service, and the like through a communication network. According to an embodiment of the present disclosure, the cellular module 3021 may identify and authenticate the electronic device 3001 in a communication network using the SIM 3029 (e.g., a SIM card). According to an embodiment of the present disclosure, the cellular module 3021 may perform at least part of functions which may be provided by the processor 3010. According to an embodiment of the present disclosure, the cellular module 3021 may include a communication processor (CP).

The Wi-Fi module 3022, the BT module 3023, the GNSS module 3024, the NFC module 3025, or the MST module 3026 may include, for example, a processor for processing data transmitted and received through the corresponding module. According to various embodiments of the present disclosure, at least some (e.g., two or more) of the cellular module 3021, the Wi-Fi module 3022, the BT module 3023, the GNSS module 3024, the NFC module 3025, or the MST module 3026 may be included in one integrated chip (IC) or one IC package.

The RF module 3027 may transmit and receive, for example, a communication signal (e.g., an RF signal). Though not shown, the RF module 3027 may include, for example, a transceiver, a power amplifier module (PAM), a frequency filter, or a low noise amplifier (LNA), or an antenna, and the like. According to another embodiment of the present disclosure, at least one of the cellular module 3021, the Wi-Fi module 3022, the BT module 3023, the GNSS module 3024, the NFC module 3025, or the MST module 3026 may transmit and receive an RF signal through a separate RF module.

The SIM 3029 may include, for example, a card which includes a SIM and/or an embedded SIM. The SIM 3029 may include unique identification information (e.g., an integrated circuit card identifier (ICCID)) or subscriber information (e.g., an international mobile subscriber identity (IMSI)).

The memory 3030 may include, for example, an embedded memory 3032 or an external memory 3034. The embedded memory 3032 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 3034 may include a flash drive, for example, a compact flash (CF), a secure digital (SD), a micro-SD, a mini-SD, an extreme digital (xD), a multimedia car (MMC), or a memory stick, and the like. The external memory 3034 may operatively and/or physically connect with the electronic device 3001 through various interfaces.

The security module 3036 may be a module which has a relatively higher secure level than the memory 3030 and may be a circuit which stores secure data and guarantees a protected execution environment. The security module 3036 may be implemented with a separate circuit and may include a separate processor. The security module 3036 may include, for example, an embedded secure element (eSE) which is present in a removable smart chip or a removable SD card or is embedded in a fixed chip of the electronic device 3001. Also, the security module 3036 may be driven by an OS different from the OS of the electronic device 3001. For example, the security module 3036 may operate based on a java card open platform (JCOP) OS.

The sensor module 3040 may measure, for example, a physical quantity or may detect an operation state of the electronic device 3001, and may convert the measured or detected information to an electric signal. The sensor module 3040 may include at least one of, for example, a gesture sensor 3040A, a gyro sensor 3040B, a barometric pressure sensor 3040C, a magnetic sensor 3040D, an acceleration sensor 3040E, a grip sensor 3040F, a proximity sensor 3040G, a color sensor 3040H (e.g., red, green, blue (RGB) sensor), a biometric sensor 3040I, a temperature/humidity sensor 3040J, an illumination sensor 3040K, or an ultraviolet (UV) sensor 3040M. Additionally or alternatively, the sensor module 3040 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 3040 may further include a control circuit for controlling at least one or more sensors included therein. According to various embodiments of the present disclosure, the electronic device 3001 may further include a processor configured to control the sensor module 3040, as part of the processor 3010 or to be independent of the processor 3010. While the processor 3010 is in a sleep state, the electronic device 3001 may control the sensor module 3040.

The input device 3050 may include, for example, a touch panel 3052, a (digital) pen sensor 3054, a key 3056, or an ultrasonic input device 3058. The touch panel 3052 may use at least one of, for example, a capacitive type, a resistive type, an infrared type, or an ultrasonic type. Also, the touch panel 3052 may further include a control circuit. The touch panel 3052 may further include a tactile layer and may provide a tactile reaction to a user.

The (digital) pen sensor 3054 may be, for example, part of the touch panel 3052 or may include a separate sheet for recognition. The key 3056 may include, for example, a physical button, an optical key, or a keypad. The ultrasonic input device 3058 may allow the electronic device 3001 to detect a sound wave using a microphone (e.g., a microphone 3088) and to verify data through an input tool generating an ultrasonic signal.

The display 3060 may include a panel 3062, a hologram device 3064, or a projector 3066. The panel 3062 may be implemented to be, for example, flexible, transparent, or wearable. The panel 3062 and the touch panel 3052 may be integrated into one module. The hologram device 3064 may show a stereoscopic image in a space using interference of light. The projector 3066 may project light onto a screen to display an image. The screen may be positioned, for example, inside or outside the electronic device 3001. According to an embodiment of the present disclosure, the display 3060 may further include a control circuit for controlling the panel 3062, the hologram device 3064, or the projector 3066.

The interface 3070 may include, for example, a high-definition multimedia interface (HDMI) 3072, a universal serial bus (USB) 3074, an optical interface 3076, or a D-subminiature 3078. The interface 3070 may be included in the communication interface. Additionally or alternatively, the interface 3070 may include, for example, a mobile high definition link (MHL) interface, an SD card/multimedia card (MMC) interface, or an infrared data association (IrDA) standard interface.

The audio module 3080 may convert a sound and an electric signal in dual directions. At least part of components of the audio module 3080 may be included in an input and output interface. The audio module 3080 may process sound information input or output through, for example, a speaker 3082, a receiver 3084, an earphone 3086, or the microphone 3088, and the like.

The camera module 3091 may be a device which captures a still image and a moving image. According to an embodiment of the present disclosure, the camera module 3091 may include one or more image sensors (not shown) (e.g., a front sensor or a rear sensor), a lens (not shown), an image signal processor (ISP) (not shown), or a flash (not shown) (e.g., an LED or a xenon lamp).

The power management module 3095 may manage, for example, power of the electronic device 3001. According to an embodiment of the present disclosure, though not shown, the power management module 3095 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 3096 and voltage, current, or temperature thereof while the battery 3096 is charged. The battery 3096 may include, for example, a rechargeable battery or a solar battery.

The indicator 3097 may display a specific state of the electronic device 3001 or part (e.g., the processor 3010) thereof, for example, a booting state, a message state, or a charging state, and the like. The motor 3098 may convert an electric signal into mechanical vibration and may generate vibration or a haptic effect, and the like. Though not shown, the electronic device 3001 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions. The computer-readable storage medium may be, for example, the memory.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A stylus pen configured to provide an input to an electronic device, the stylus pen comprising:

a pen body formed with respect to an axis and including an outer surface, an inner surface, a printed circuit board including at least one switching component, a function button configured to turn on/off the at least one switching component, and a reinforcing bracket, wherein the pen body extends in a direction of the axis;

a cap disposed on one end of the pen body;

a first structure configured to make contact with at least a portion of the inner surface of the pen body and to change in length in the direction of the axis in response to pressure applied to the cap;

a second structure configured to make contact with at least a part of the first structure and to limit a movement of at least one of the cap or the first structure in the direction of the axis; and a touch tip disposed on an opposite end of the pen body, wherein the reinforcing bracket is attached to an end of the function button, and the reinforcing bracket includes a free end portion and an anchored end portion opposite the free end portion.

2. The stylus pen of claim 1, wherein the first structure includes:

a shaft movable along the axis in an inner space adjacent to the opposite end of the pen body.

3. The stylus pen of claim 2, wherein the first structure further includes:

an elastic member configured to elastically support the shaft.

4. The stylus pen of claim 3, wherein the first structure further includes:

a cam mechanism configured to move the shaft along the axis in cooperation with the elastic member.

5. The stylus pen of claim 4, wherein the cam mechanism includes:

a first moving member configured to linearly move along the axis as an external force is applied to the cap; and a second moving member configured to rotate while linearly moving together with the linear movement of the first moving member.

6. The stylus pen of claim 5, wherein the first moving member has one or more cam surfaces, and wherein the second moving member has one or more second cam surfaces that slide relative to the first cam surfaces.

7. The stylus pen of claim 5, wherein the cam mechanism further includes:

a guide structure configured to guide the movement of the first moving member and the second moving member.

8. The stylus pen of claim 7, wherein the guide structure includes:

a linear guide part provided on the inner surface of the pen body to guide the linear movement of the first moving member and the second moving member; and a rotary guide part configured to guide the rotary motion of the second moving member.

9. The stylus pen of claim 5, wherein the first moving member is connected to the cap.

10. The stylus pen of claim 9, wherein the second structure includes:

a restriction step configured to limit a movement of at least one of the cap and the first moving member.

11. The stylus pen of claim 10, wherein the second structure further includes:

a restriction unit configured to limit a relative moving distance between the first moving member and the second moving member.

12. The stylus pen of claim 11, wherein the restriction unit includes:

a connecting member configured to elastically connect the first moving member and the second moving member.

* * * * *